United States Patent
Murphy et al.

(10) Patent No.: US 7,409,604 B2
(45) Date of Patent: Aug. 5, 2008

(54) DETERMINATION OF RELATED FAILURE EVENTS IN A MULTI-NODE SYSTEM

(75) Inventors: Brendan Murphy, Cambshire (GB); Archana Ganapathi, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 10/741,094

(22) Filed: Dec. 19, 2003

(65) Prior Publication Data

US 2005/0188240 A1 Aug. 25, 2005

(51) Int. Cl.
*G06F 11/00* (2006.01)

(52) U.S. Cl. .............................. 714/48; 714/4; 714/25; 714/43; 714/45; 714/48

(58) Field of Classification Search ...................... 714/4, 714/25, 31, 39, 43, 45, 47, 48, 56
See application file for complete search history.

(56) References Cited

U.S. PATENT DOCUMENTS

| | | | |
|---|---|---|---|
| 6,006,016 A | * | 12/1999 | Faigon et al. ................. 714/48 |
| 6,862,698 B1 | * | 3/2005 | Shyu ............................ 714/57 |
| 6,978,302 B1 | * | 12/2005 | Chisholm et al. ............ 709/224 |
| 7,149,917 B2 | * | 12/2006 | Huang et al. .................... 714/4 |
| 2002/0170002 A1 | * | 11/2002 | Steinberg et al. .............. 714/39 |
| 2003/0074440 A1 | * | 4/2003 | Grabarnik et al. ........... 709/224 |

OTHER PUBLICATIONS

Murphy et al.; Measuring System and Software Reliability Using an Automated Data Collection Process; Digital Equipment Scotland Ltd. (12 pages).
Appleby, K. et al.; Yemanja—A Layered Fault Localization System for Multi-Domain Computing Utilities; Journal of Network and Systems Management, Vol. 10, No. 2, Jun. 2002, pp. 171-194.
Microsoft Windows Server 2003; Maximizing Availability on the Windows Server 2003 Platform (Manual); Microsoft Corporation; Published: May 2003; 20 pages.
Microsoft Windows Server 2003; Server Clusters: Architecture Overview, for Windows Server 2003 (Manual); Microsoft Corporation; Published: Mar. 2003.
Microsoft Windows Server 2000; Nework Load Balancing Technical Overview (Manual); Published: 2000; (32 pages).

* cited by examiner

*Primary Examiner*—Robert W Beausoliel, Jr.
*Assistant Examiner*—Charles Ehne

(57) ABSTRACT

Systems and methods for determining related node failures in a multi-node system use log data obtained from the nodes. This log data is processed in various ways to indicate clusters of nodes that experience related failures.

53 Claims, 16 Drawing Sheets

DETERMINATION OF RELATED FAILURE EVENTS IN A MULTI-NODE SYSTEM

BACKGROUND

Large scale computer networks typically include many interconnected nodes (e.g., computers or other addressable devices). In some such networks, various ones of the nodes may be functionally or physical interrelated or interdependent. Due to the interconnections, interrelations, and interdependencies, a failure in one node of a network may have consequences that affect other nodes of the network.

Unfortunately, due to the complex interconnections and interdependencies between the various nodes in such computer networks, coupled with the high rate of configuration change, it may be exceedingly difficult to determine which failures are related, let alone the source or sources of failures.

SUMMARY

Implementations described and claimed herein address the foregoing problems and offer various other benefits by providing systems and methods that facilitate the identification of interrelated failures in computer systems and networks.

DETAILED DESCRIPTION

Described herein are implementations of various systems and methods which aid in identifying related failures in a multi-node computer system. More particularly, various systems and methods described herein obtain and process information related to individual nodes in a multi-node system to identify interrelated node failures, such as cascade failures. By identifying these interrelated node failures, vulnerabilities in the multi-node system may be identified and appropriate actions may be taken to eliminate or minimize such vulnerabilities in the future.

In general, a node is a processing location in a computer network. More particularly, in accordance with the various implementations described herein, a node is a process or device that is uniquely addressable in a network. For example, and without limitation, individually addressable computers, groups or cluster of computers that have a common addressable controller, addressable peripherals, such as addressable printers, and addressable switches and routers, are all examples of nodes.

As used herein, a node group comprises two or more related nodes. Typically, although not necessarily, a node group will comprise all of the nodes in a given computer network. For example, and without limitation, all of the nodes in a particular local area network (LAN) or wide are network (WAN) may comprise a node group. Similarly, all the nodes in a given location or all of the functionally related nodes in a network, such as a server farm, may comprise a node group. However, in a more general sense, a node group may include any number of operably connected nodes. As will be described, it is with respect to a particular node group that the various systems and methods set forth herein are employed.

Figure 1:
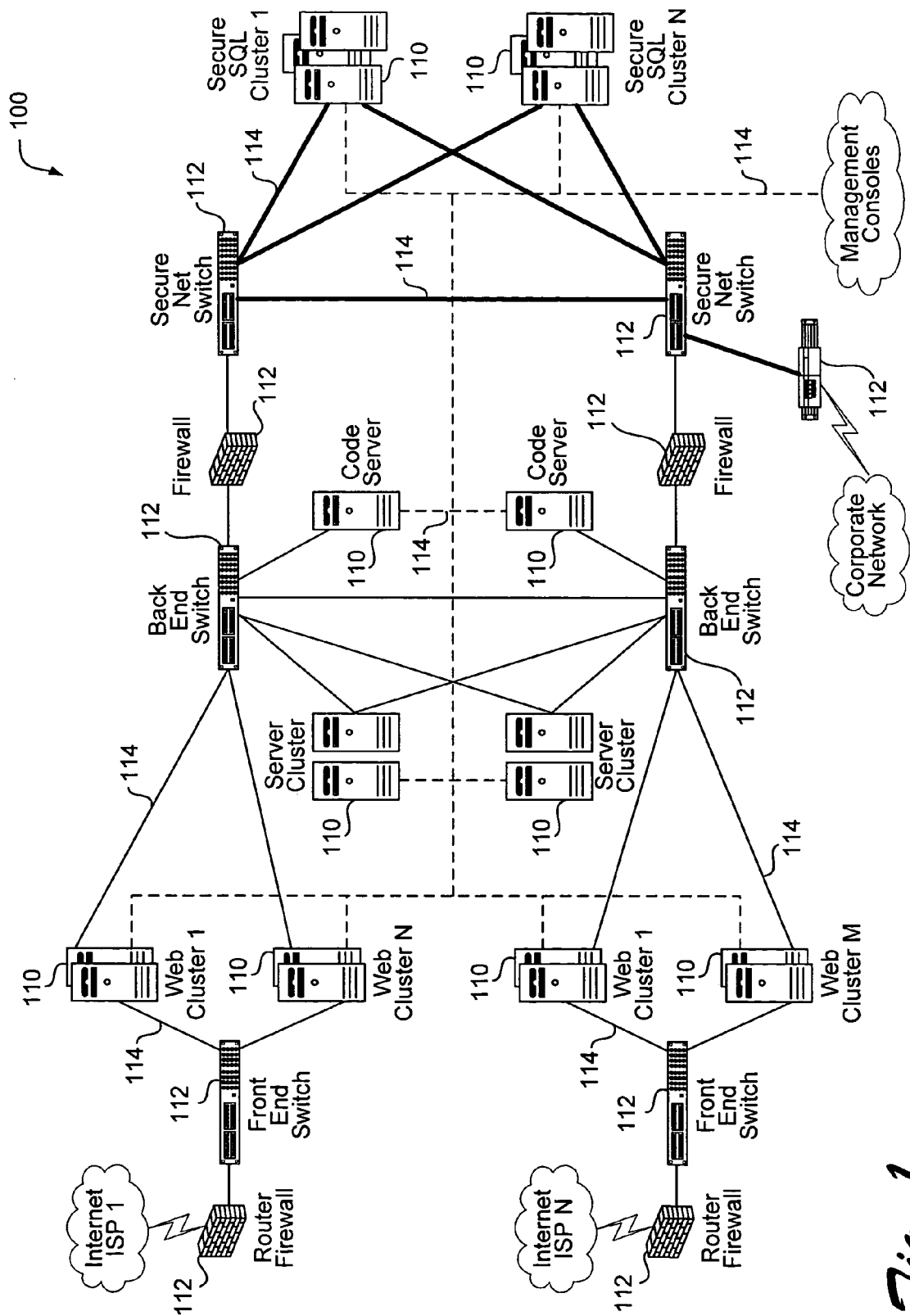
FIG. 1 illustrates an exemplary multi-node computer network environment in which the systems and methods described herein may be implemented.

Turning first to FIG. 1, illustrated therein is an exemplary computer network 100 in which, or with respect to which, the various systems and methods described herein may be employed. In particular, FIG. 1 illustrates a server farm 100 including a number of server computers 110 and other devices 112 that may be present in a complex computer network. FIG. 1 also shows various communications paths 114 or channels through or over which the various servers 110 and other devices 112 communicate. As previously described, the nodes in a computer network, such as computer network 100, comprise those servers, server clusters, and other devices that are uniquely addressable in the network 100.

As will be appreciated, due to the complex physical and functional interconnections and interrelationships between the various nodes in a network, such as the network 100, failures in one node may have consequences that affect other nodes in the network 100. For example, a failure in one server may cause a number of other related servers to fail. These types of failures are typically referred to as cascade failures.

Unfortunately, due to the complex interconnections and interrelationships between the various nodes in such a network, the source or sources of such cascade failures may be very difficult to pinpoint. Furthermore, due to these complex interconnections and interrelationships, it may exceedingly difficult to even determine which node failures are related. As will now be described, the various exemplary systems and methods set forth herein facilitate identification of such interrelated failures and node relationships in computer systems and networks.

It should be understood that the network 100, and the various servers 110, other devices 112, and connections 114, shown in FIG. 1 are not intended in any way to be inclusive of all servers 110, devices 112, connections 114, or topologies in which, or with respect to which, the various systems and methods described herein may be employed. Rather, the system 100 of FIG. 1 is intended only to give the reader a general appreciation and understanding of the complexities and problems involved in managing such large computer networks.

Figure 2:
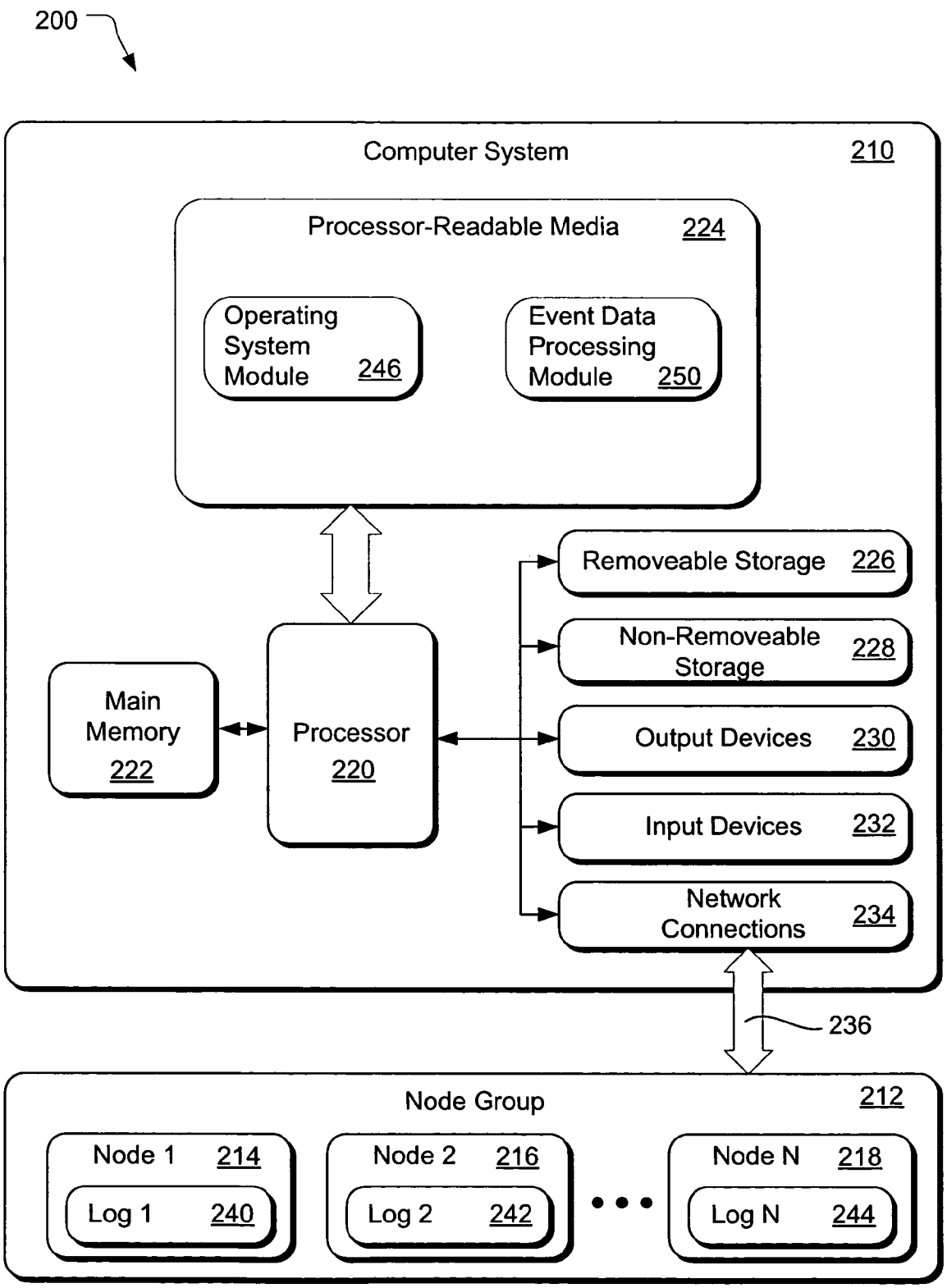
FIG. 2 illustrates an exemplary computer system including an exemplary event data processing module in which the systems and methods described herein may be implemented.

Turning now to FIG. 2, illustrated therein is one exemplary multi-node network 200 in which the various systems and methods described herein may be implemented. As shown, the network 200 includes an exemplary computer system 210 in operable communication with an exemplary node group 212, including a number (n) of nodes 214-218. It should be understood that although the computer system 210 is shown as separate from the node group 212, the computer system 210 may also be a part of the node group 212.

It should be understood that the exemplary computer system 210 illustrated in FIG. 2 is simplified. A more detailed description of an exemplary computer system is provided below with respect to FIG. 16.

The exemplary computer system 210 includes one or more processors 220, main memory 222, and processor-readable media 224. As used herein, processor-readable media may comprise any available media that can store and/or embody or carry processor executable instructions, and that is accessible, either directly or indirectly by a processor, such as processor 220. Processor-readable media may include, without limitation, both volatile and nonvolatile media, removable and non-removable media, and modulated data signals. The term "modulated data signal" refers to a signal that has one or more of its characteristics set or changed in such a manner as to encode information in the signal.

In addition to the processor(s) 220, main memory 222, and processor-readable media 224, the computer system 210 may also include or have access to one or more removable data storage devices 226, one or more non-removable data storage devices 228, various output devices 230, and/or various input devices 232. Examples of removable storage devices 226 include, without limitation, floppy disks, zip-drives, CD-ROM, DVD, removable flash-RAM, or various other removable devices including some type of processor-readable media. Examples of non-removable storage devices 228 include, without limitation, hard disk drives, optical drives, or various other non-removable devices including some type of processor-readable media. Examples of output devices 230 include, without limitation, various types on monitors and printers, etc. Examples of input devices 232 include, without limitation, keyboards, mice, scanners, etc.

As shown, the computer system 210 includes a network communication module 234, which includes appropriate hardware and/or software for establishing one or more wired or wireless network connections 236 between the computer system 210 and the nodes 214-218 using of the node group 212. As described in greater detail below, in accordance with one implementation, it is through the network connection 236 that information (event log data) is received by the computer system 210 from the nodes 214-218 of the node group 212. However, in accordance with other embodiments, the information may be received by the computer system 210 from the nodes 214-218 via other means, such as via a removable data storage device, or the like.

As previously noted, a node group, such as node group 212, comprises two or more related nodes. Nodes may be related in a node group via a physical, functional, or some other relationship. For example, nodes that draw their power from a common power line or circuit, or which are connected via a common physical link (phy layer), may be said to be physically related. All the nodes located at a particular location may be said to be physically related. For example, all of the nodes a given building, or a particular suite in a building, may said to be physically related. Nodes over which tasks or functions are distributed may be said to be functionally related. For instance, each of the nodes in a load balanced system may be said to be functionally related.

It should be understood that the following examples of nodal relationships are merely exemplary and are not intended to specify all possible ways in which nodes may be physically or functionally related in a node group. Rather, in a broad sense, nodes may be said to be related to one another if they are designated or grouped so, such as by an architect or administrator of a system or network that is being analyzed.

In accordance with various implementations, each node of a node group includes, or has associated therewith, an event log. For example, as shown in FIG. 2, nodes 214, 216, and 218 in node group 212 each include an event log 240, 242, and 244, respectively. In accordance with some implementations, event logs are stored in some form of processor-readable media at the node to which its information relates. In accordance with other implementations, event log may be stored in processor-readable media at a location or locations other than the node to which its information relates. In accordance with yet other implementations, event logs are created in "real time" and transmitted to the computer system 210 for processing.

Generally, each event log includes information related to the physical and/or functional state of the node to which its information relates. For example, in accordance with various implementations, each event log includes information related to the shutting down and starting up of the node. That is, each event log includes information that indicates times at which the node was and was not operational. Additionally, an event log may indicate whether a shut down of the node was a "user controlled shut down," where the node is shut down in accordance with proper shut down procedures, or a "crash," where the node was shut down in a manner other than in accordance with proper shut down procedures.

In accordance with various implementations described herein, event data related to the start up of a node will be referred to as an "up event." Conversely, event data related to the shut down of a node will be referred to as a "down event."

The precise information that is stored in the event log and the format of the stored information may vary, depending on the specific mechanism that is used to collect and store the event log information. For example, in accordance with one implementation, event logs in the nodes are created by the Windows NT® "Event Log Service," from Microsoft® Corporation. In accordance with another implementation, the event logs in the nodes are created using the "event service" in the Microsoft® Windows® 2000 operation system. Those skilled in the art will appreciate that other event log mechanism are available for other operating systems, and/or from other sources. For example, and without limitation, server applications, such as SQL, Exchange, and IIS, also write event logs, as do other operating systems, such as UNIX, MVS, etc.

As shown, the processor-readable media 224 includes an event processing module 250 and an operating system. As described in detail with respect to FIG. 3, the event processing module 250 includes a number of modules 310-338, which perform various operations related to the processing and analysis of event data from the logs of the nodes in the node group 212. As will be appreciated, the operating system 246 comprises processor executable code. In general, the operating system 246 manages the hardware and software resources of the computer system 210, provides an operating environment for any or all of the modules 310-338 of the event processing module 250, APIs, and other processor executable code.

Figure 3:
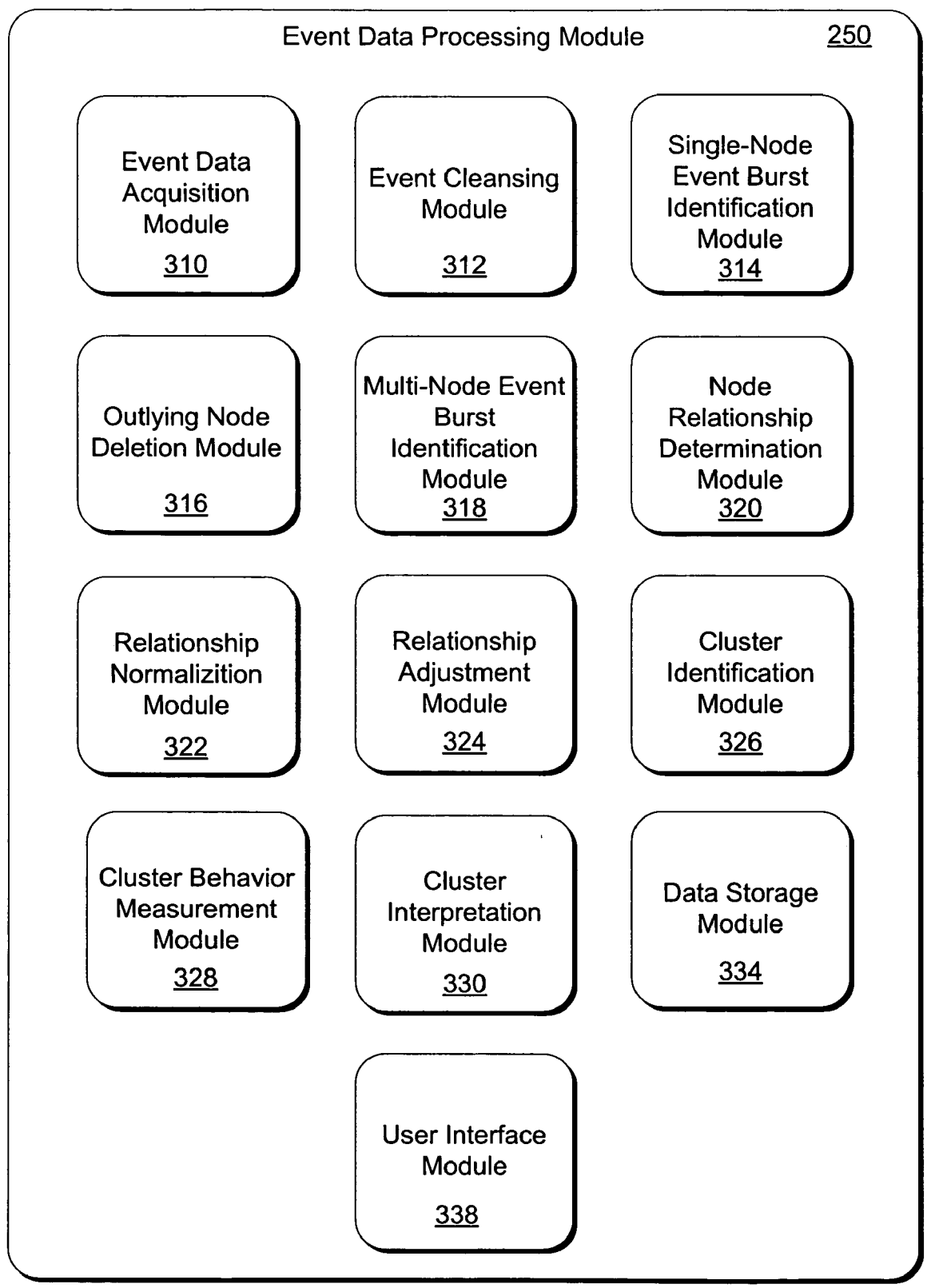
FIG. 3 illustrates exemplary modules of the event data processing module illustrated in FIG. 2.

Turning now more particular to the details of the event processing module 250 shown in FIG. 3, as previously noted, the event processing module 250 collects and processes event data from each of the nodes of the node group 212. More particularly, the event processing module 250 identifies clusters of nodes in the node group 212 which appear to have related failures. Additionally, the event processing module 250 uses information related to the clusters of nodes to determine various metrics related to the general reliability of the node group 212.

As shown and described in detail with respect to FIG. 3, the event processing module 250 includes a number of modules 310-338. Generally, a module, such as the modules and 310-338, may include various programs, objects, components, data structures, and other processor-executable instructions, which perform particular tasks or operations or implement particular abstract data types. While described herein as being executed or implemented in a single computing device, such as computer system 210, any or all of the modules 310-338 may likewise be executed or implemented in a distributed computing environment, where tasks are performed by remote processing devices or systems that are linked through a communications network. Furthermore, it should be understood that while each of the modules 310-338 are described herein as comprising computer executable instructions embodied in processor-readable media, the modules, and any or all of the functions or operations performed thereby, may likewise be embodied all or in part as interconnected machine logic circuits or circuit modules within a computing device. Stated another way, it is contemplated that the modules 310-338 and their operations and functions, may be implemented as hardware, software, firmware, or various combinations of hardware, software, and firmware. The implementation is a matter of choice dependent on desired performance and other requirements.

Details regarded the processes, modules, and operations carried out by the event processing module 250 will now be described with respect to various modules included therein, as shown in FIG. 3. In general, the event data acquisition module 310 collects event data from the logs of each node in the node group 212. The event data acquisition module 310 may either acquire the event data from the nodes of the node group 212 actively, where each of the nodes are queried for the log data, or passively, where the event data is delivered to the event data acquisition module 310, either by a mechanism in the node itself or by another mechanism. The precise manner in which the event data acquisition module 310 acquires event data from the event logs may be dependent on the manner in which, or the mechanism by which, the event data was stored in the logs.

In accordance with one implementation, the event data acquisition module 310 comprises or includes an "Event Log Analyzer (ELA)" tool from Microsoft® Corporation for acquiring log data from the nodes of the node group 212. However, those skilled in the art will appreciate that there are number of other applications or tools that may be used to acquire event log information. Often these applications and tools are specific to the type of operating system running on the node from which the event log is being acquired.

In accordance with another implementation, the data acquisition module 310 comprises the Windows Management Instrumentation (WMI), from Microsoft® Corporation. As will be appreciated by those skilled in the art, WMI is a framework for accessing and sharing information over an enterprise network. In accordance with this implementation, each node is instrumented to provide event data (called a WMI provider), and this data can be sent to, or collected by, the WMI Control which can then be stored in a management server(s) (WMI repository). This event information is then stored into database(s). The data storage module 334 then collects and stores the data from the database(s). As will be appreciated to those skilled in the art, data can be extracted from a database(s) and stored in another database, such as the data storage module 334, using standard processes (e.g., SQL queries, Data Transformation Services, etc.)

In general, it is contemplated that the event data acquisition module 310 may comprise or include any of these available applications or tools. Furthermore, it is contemplated that the event data acquisition module 310 may comprise a number of these applications and tools.

Once acquired, the acquired event data from each node is passed by the event data acquisition module 310 to the data storage module 334, where they are stored in an event table (ET) associated with the node from which the data were extracted. It should be noted that the term "table" is used here, and through this detailed description, to refer to any type of data structure that may be used to hold the data that is stored therein.

In accordance with one embodiment, the event data acquisition module 310 creates a node id table, which is stored by the data storage module 334. The node id table may include, without limitation, a unique identifier and a node name for each node for which event data was passed.

Generally, the data storage module 334 handles the storage and access of various data that is acquired, manipulated, and stored by the modules 310-338. Stated another way, the data storage module 334 acts as a kind of central repository for various data and data structures (e.g., tables) that are used and produced by the various modules of the event processing module 250.

In accordance with one implementation, the data storage module 334 comprises a database application that stores information on removable or non-removable data storage devices, such as 226 and/or 228. For example, and without limitation, in accordance with one implementation, the data storage module 334 comprises a database application that uses a structured query language (SQL). In such an implementation, the data storage module may retrieve and store data in the database using standard SQL APIs. In accordance with other implementations, the data storage module 334 may comprise other database applications or other types of storage mechanism, applications or systems.

While the data storage module 334 is described herein as comprising a data application or program that is executed by the processor 220, it is to be understood that the data storage module 334 may comprise any system or process, either within the computer system 210 or separate for the computer system 210 that is operable to store and access data that is acquired, manipulated, and/or stored by the modules 310-328. For example, and without limitation, the data storage module 334 may comprise a SQL server that is separate from, but accessible by, the computer system 210.

In general, the event cleansing module 312 performs a number of functions related to the pre-processing of the event data acquired by the event data acquisition module 310. Included in those functions are event pairing functions and erroneous data removal functions.

In accordance with one implementation, the event pairing function examines the acquired event data, for each node, stored in an ET and pairs each down event in the ET with an up event. The paired down and up events indicate the beginning and ending of an outage event (node down) occurring in the node. As such, each pair of down and up event is referred to herein as an outage event.

The precise manner in which down events are paired with up events by the event pairing function may vary, depending on such things as the format of the event in the ET. However, in accordance with one implementation, the event pairing function steps through every node and steps through every event in the event table, for that node, chronologically from the beginning to the end of the ET. During this process, each up event is paired with the succeeding down event to create an outage event. Once determined, the outage events are passed to the data storage module and stored in an outage event table (OET). In accordance with one implementation, the outage events are stored in the OET in chronological order.

In the process of pairing down and up events, the case may arise where a down event is followed by another down event. Conversely, the case may arise where an up event is followed by another event. Both of these cases are erroneous, since up and down events must occur in down event-up event pairs (outage event). In such cases, the event pairing function creates either another up event or another down event in the ET for that node to correct the problem. The event pairing function determines whether to create an up or down event, and determines the position of the up or down event in the ET based on the context of events in the ET.

In accordance with one embodiment, when appropriate, the event pairing function creates an up event at a given time ($t_{up}$) following a down event. Similarly, when appropriate, the event pairing function creates a down event at a given time ($t_{down}$) prior an up event. In this way, the event pairing function ensures that there is an up event for every down event in the ET.

The times $t_{up}$ and $t_{down}$ may be determined in a number of ways. For example, and without limitation, in accordance with one implementation, $t_{down}$ and $t_{up}$ are both calculated as the average down time between down events and succeeding up events of an outage event is first calculated. The times $t_{down}$ and $t_{up}$ may be calculated using only the event log data from a single-node or from event log data from two or more nodes in the node group. In accordance with one implementation, the times $t_{down}$ and $t_{up}$ are calculated using all of the event log data from all of the nodes in the node group.

In general, the erroneous data removal function flags in the OET outage events that are to be ignored in various subsequent processes. As will be appreciated, up and down events may occur and/or be recorded that are not useful or desired in subsequent processes. For example, event data from nodes that are known to be faulty or which are test nodes may be flagged in the OET. As another example, analysis may indicate that nodes that are down for longer than a specified time are likely down due to site reconfigurations. If event data related to faulty nodes or site reconfigurations are not being analyzed in subsequent processes, the outage events related to this long down time may flagged in the OET.

The precise manner in which the erroneous data removal function determines which outage events are to be flagged may vary. In accordance with one implementation, the erroneous data removal function accesses a list of rules that specify various parameters of the outage events that are to be flagged. For example, and without limitation, a rule may specify if the time between a down event and an up event in an outage event is greater than a given time $t_{max}$, the outage event should be flagged in the OET. It will be appreciated that various other rules may be developed and stored for use by the erroneous data removal function.

The event pairing function and the erroneous data removal function may be carried out by the event cleansing module 312 in a number of ways. For example, and without limitation, in accordance with one implementation, these functions, as well as others, are carried out in accordance with the operation flow 400 illustrated in FIG. 4, as will now be described.

Figure 4:
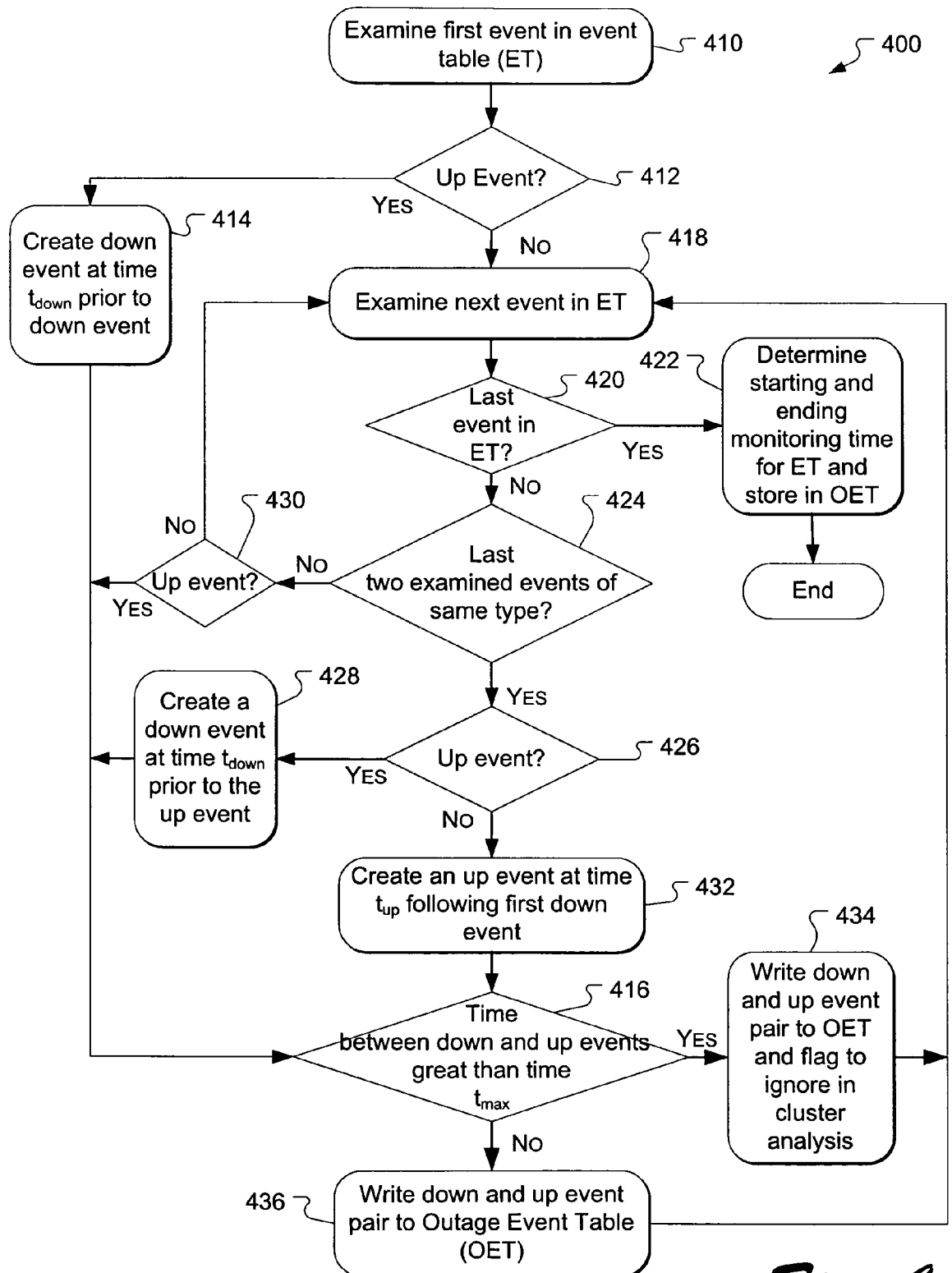
FIG. 4 illustrates an exemplary operational flow including various operations that may be performed by an event cleansing module illustrated in FIG. 3.

In accordance with one implementation, the operational flow 400 illustrated in FIG. 4 will be carried out separately for each node represented in the OET. As shown, at the beginning of the operational flow 400, an event examination operation 410 examines the first event in the ET. An event type determination operation 412 then determines whether the examined event is an up or down event. If it is determined that the event examined by the event examination operation 410 is an up event, a down event creation operation 414 creates an associated down event at a time $t_{down}$ prior to the up event in the ET. The up event examined by examination operation 410 and the down event created by the down event creation operation 414 comprise the down and up events of an outage event. Following the down event creation operation 414, the operational flow continues to a down time determination operation 416, described below.

If it is determined by the event type determination operation 412 that the event examined by examination operation 410 is a down event, an event examination operation 418 examines the next outage event in the ET. Next, a last event determination operation 420 determines whether the event examined by the event examination operation 418 is the last event in the ET. If it is determined by the last event determination operation 420 that the event examined by the event examination operation 418 is the last event in the ET, a monitor timing operation 422 then determines the starting and ending times of the time period over which the events were monitored on the node ("monitoring time"). This monitoring time may be defined by the time of first event and the time of the last event in the ET. It should be noted that in the first event and/or the last event may not be up or down events. Following the monitor timing operation 422, the operational flow 400 ends.

If it is determined in the last event determination operation 420 that the event examined by the event examination operation 418 is not the last event in the ET, the operational flow 400 proceeds to a same type determination operation 424. The same type determination operation 424 determines whether the last two events examined by either examine operation 410 or 418 were of the same type (i.e., up or down events).

If it is determined in the same type determination operation 424 that the last two events examined in the operational flow 400 were not of the same type, an up event determination operation 430 then determines whether the last event examined by the event examination operation 418 was an up event. If it is determined by the up event determination operation 430 that the last event examined by the event examination operation 418 was an up event, the operational flow proceeds to the down time determination operation 416, described below. If however, it is determined by the up event determination operation 430 that the last event examined by the event examination operation 418 was not an up event, the operational flow proceeds back to the event examination operation 418.

Returning to the same type determination operation 424, if it is determined therein that the last two events examined in the operational flow 400 were of the same type, an up event determination operation 426 then determines whether the last event examined by the event examination operation 418 was an up event. If it is determined by the up event determination operation 426 that the last event examined by the event examination operation 418 was an up event, the operational flow proceeds to a down event creation operation 428, which creates in the ET a down event at a time $t_{down}$ prior to the up event. The up event previously examined by examination operation 418 and the down event created by the down event creation operation 430 comprise the down and up events of an outage event. The operational flow 400 then proceeds to the down time determination operation 416, described below.

If it is determined by the up event determination operation 428 that the last event examined by the event examination operation 418 was not an up event (i.e., a down event), the operational flow 400 proceeds to an up event creation operation 432, which creates in the ET an up event at a time $t_{up}$ following the down event. The down event examined by examination operation 418 and the up event created by the up event creation operation 432 comprise the down and up events of an outage event. The operational flow 400 then proceeds to the down time determination operation 416.

The down time determination operation 416 determines whether the time between the down and up events that were associated as an event pair at the operation immediately preceding the down time determination operation 416 ("examined event pair") is greater than a maximum time $t_{max}$.

The maximum time $t_{max}$ may be determined in a number of ways. For example, and without limitation, in accordance with one implementation, $t_{max}$ is determined heuristically by examining the down times of a large number of nodes. From this examination, a determination is made as to what constitutes a typical down time and what constitutes an abnormally long outage. The maximum time $t_{max}$ is then set accordingly. In accordance with another implementation, $t_{max}$ is simply user defined based on the user's best judgment.

If it is determined by the down time determination operation 416 that the time between the down and up events of the examined event pair is greater than $t_{max}$, a write operation 434 writes the down and up events of the examined event pair to an outage event table (OET) and flags the examined event pair to ignore in a later cluster analysis process. The operational flow 400 then proceeds back to the event examination operation 418. The operational flow then proceeds as just described until all of the events of the node being examined have been processed.

If, however, it is determined by the down time determination operation 416 that the time between the down and up events of the examined event pair is not greater than $t_{max}$, a write operation 436 writes the down and up events of the examined event pair to the outage event table (OET), without flagging them. The operational flow 400 then proceeds back to the read next event operation 418.

As previously noted, the operational flow 400 is performed with relation to events from all nodes in the in the node group 212. In accordance with one implementation, and without limitation, after the operations flow 400 has been performed with respect to all the nodes in the in the node group 212, the OET will contain, for each event, a pointer to the node id table, the event type, the time of the event, and the flag to indicate whether the event is to be ignored or not.

Returning now to FIG. 3, in general, the single-node event burst identification module 314 identifies single-node event bursts occurring on the nodes of the node group. More particularly, in accordance with one implementation, the single-node event burst identification module 314 identifies single-node event bursts occurring on nodes that have outage events stored in the OET.

As used herein, a single-node event burst comprises a defined time period over which one or more outage events (down and up event pair) occur. As used herein, a single-node event burst is said to include an outage event if the outage event occurs in the time period defined by the single-node event burst. Often, a single-node event burst will include only a single outage event. However, a single-node event burst may also include a number of outage events that occur within a predetermined time $t_{sn}$ of one another.

Each single-node event burst has a start time and an end time. These start and end times define the signal node event burst. In accordance with one implementation, the start time of a single-node event burst comprises the time of the down event of the first outage event included in the single-node event burst. In accordance with this implementation, the end time of a single-node event burst comprises the time of the up events of the last outage event included in the single note event burst. It is to be understood that with other implementations, the start and end times of a single-node event burst may be defined in other ways.

As previously noted, a single-node event burst may include a number of outage events that occur within a predetermined time period $t_{sn}$ of one another. The maximum time $t_{sn}$ may be determined in a number of ways. For example, and without limitation, in accordance with one implementation, $t_{sn}$ is determined heuristically and based on examining the distribution of up times between events across various systems. In accordance with another implementation, $t_{sn}$ is simply user defined based on the user's best judgment.

In general, the single-node event burst identification module 314 identifies single-node event bursts on a given node by examining all of the outage events in the OET occurring on the node, and determining which of those outage events occur within the time period $t_{sn}$ from one another. As will be appreciated, there may be a number of ways by which the single-node event burst identification module 314 may determine which nodes are within the time period $t_{sn}$ from one another. That is, there may be a number of ways by which the single-node event burst identification module 314 may define a single-node event burst using the outage events in the OET and the time period $t_{sn}$. However, in accordance with one implementation, the single-node event burst identification module 314 defines single-node events burst occurring on the nodes of the node group 212 using the operations set forth in the operational flow 500 shown in FIG. 5, which will now be described.

The operation flow 500 is perform for every node in the node group 212 that has at least one outage event in the OET. As used herein, the node with respect to which the operational flow 500 is being performed will be referred to as the examined node. In accordance with one implementation, prior to performing the operational flow 500 with respect to the examined node, the outage events for the examined node will be read from the OET, chronologically. In accordance with one implementation, as previously noted, the outage events will have been stored in the OET in chronological order by the event cleansing module 312.

Figure 5:
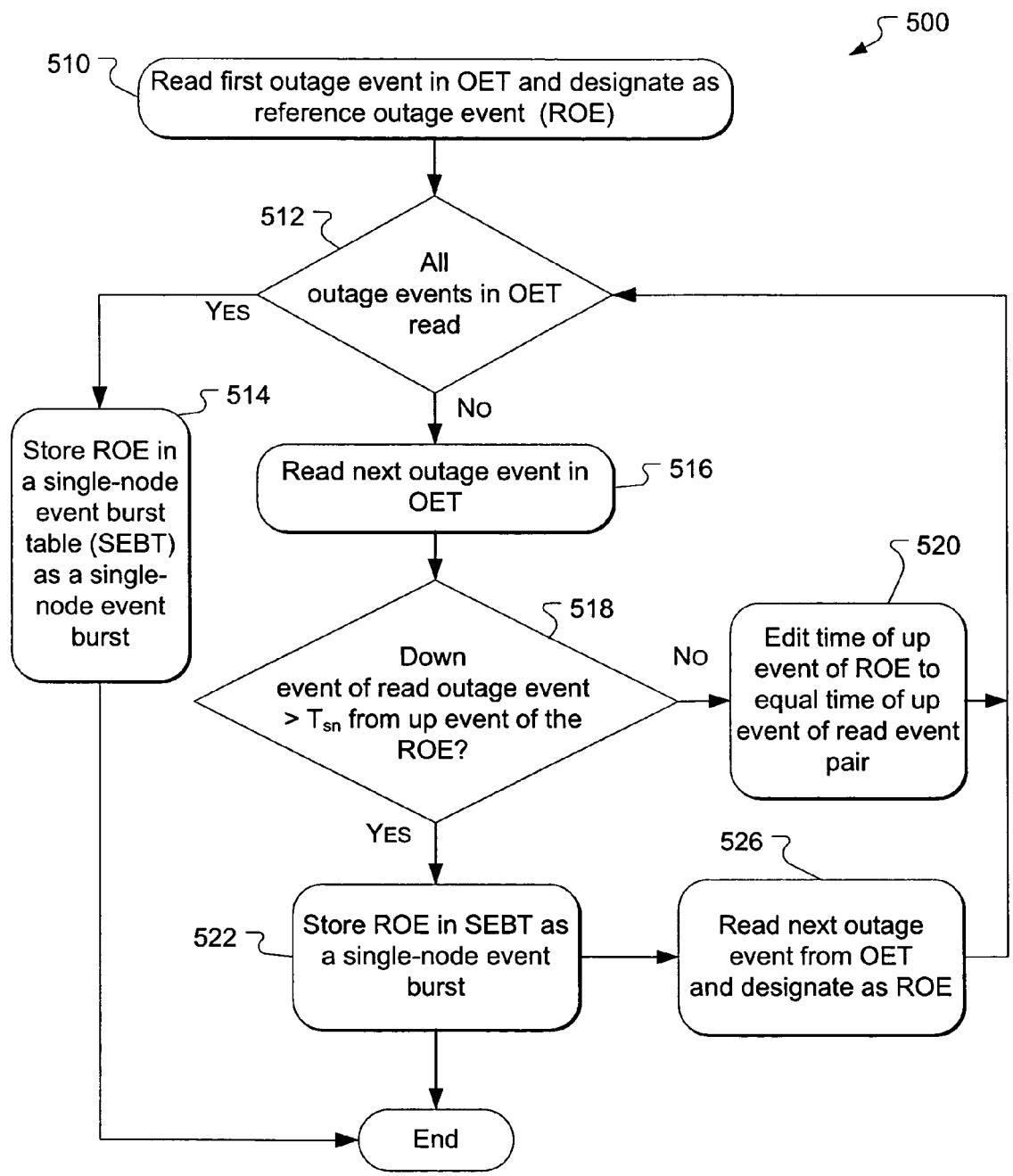
FIG. 5 illustrates an exemplary operational flow including various operations that may be performed by a single-node event burst identification module illustrated in FIG. 3.

As shown in FIG. 5, at the beginning of the operational flow 500, a read operation 510 reads the first outage event in the OET and designates the extracted outage event as the reference outage event (ROE). Next, a determination operation 512 determines whether all of the outage events in the OET have been read. If it is determined by the determination operation 512 that all of the outage events have been read, a store operation 514 stores the ROE in an single-node event burst table (SEBT) as a single-node event burst. If, however, it is determined by the determination 512 that all of the outage events in the OET have not been read, a read operation 516 reads the next outage event (chronologically) in the OET.

Following the read operation 516, a timing determination operation 518 determines whether the time of the down event of the outage event read by the read operation 516 is greater than a predetermined time $t_{sn}$ from the time of the up event of the ROE. If it is determined by the timing determination operation 518 that the time of the down event of the read outage event is not greater than the predetermined time $t_{sn}$ from the time of the up event of the ROE, an edit operation 520 edits the time of the up event of the ROE to equal the time of the up event of the read event pair. Following the edit operation 522, the operational flow 500 returns to the determination operation 512. If, however, it is determined by the timing determination operation 518 that the time of the down event of the last read outage event is greater than the predetermined time $t_{sn}$ from the time of the up event of the ROE, a store operation 522 stores the ROE in the SEBT as a single-node event burst.

Following the store operation 522, a read operation 526 reads the next outage event from in OET and designates the read outage event as ROE. The operational flow 500 then returns to the determination operation 512.

As previously noted, the operation flow 500 is perform for every node in the node group 212 that has at least one outage event in the OET. Thus, after the operations flow 500 has been performed for all these nodes, the SEBT will include single-node event burst for all of the nodes that have at least one outage event in the OET. Additionally, in accordance with various implementations, the SEBT will include, for each event, a pointer to the node id table and a pointer to the corresponding event in the OET.

Returning now to FIG. 3, in general, the outlying node deletion module 316 removes from the SEBT, or flags to ignore, all outage events from nodes that are determined to be unreliable in comparison to the average reliability of all the nodes in the node group 212. As will be appreciated, there are a number of ways that node reliability may be determined. For example, and without limitation, reliability of a node may be based on the average time between outage events.

Once the reliability for each node has been determined, the average reliability for all nodes on the system may be determined. The reliability for each individual node can then be compared to the average reliability for all nodes on the system. If a the reliability of an individual node does not meet some predefined criteria, relative to the average reliability of all nodes in the node group, all outage events for that node are then removed from the SEBT, or flagged.

Figure 6:
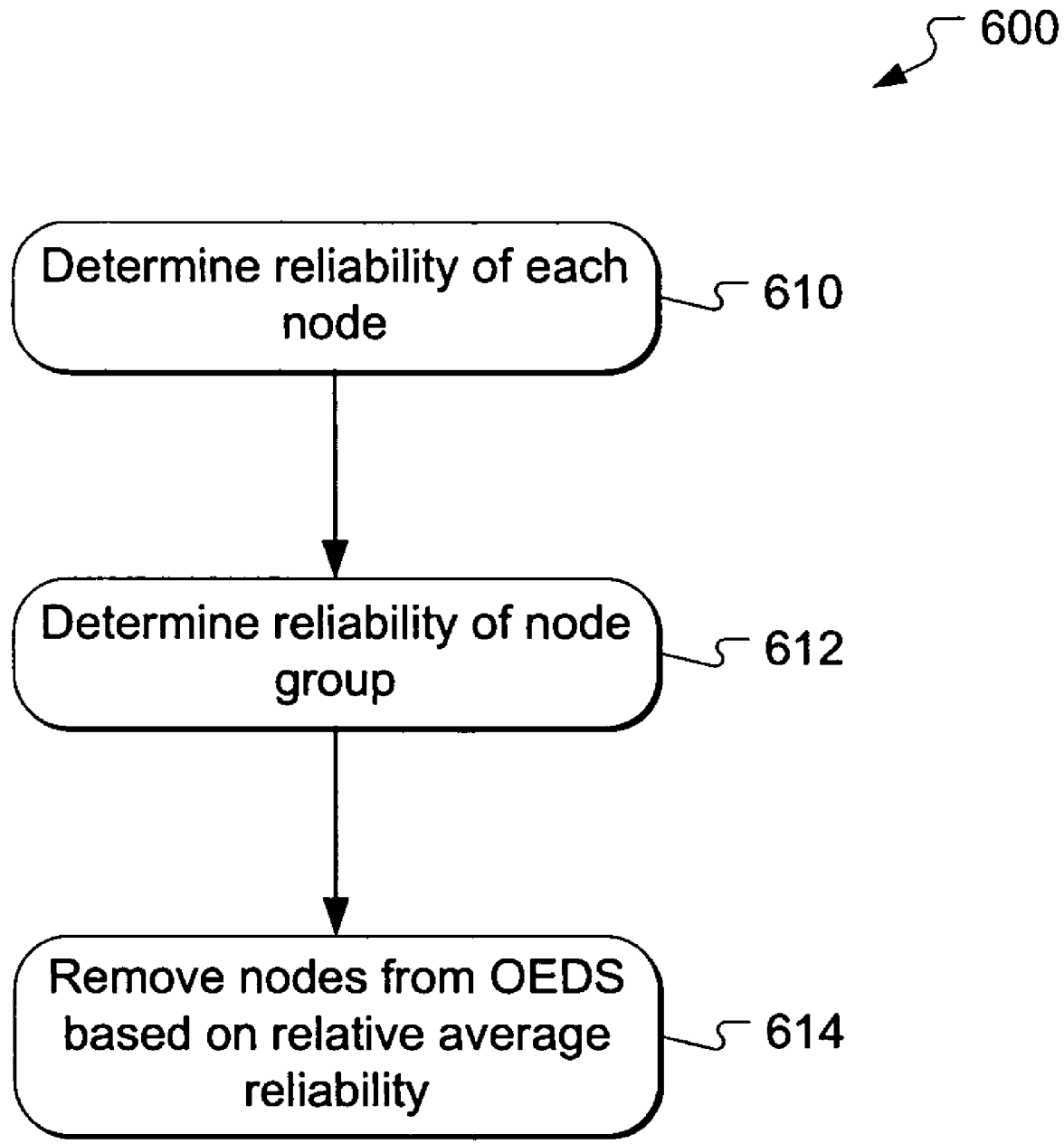
FIG. 6 illustrates an exemplary operational flow including various operations for that may be performed by an outlying node deletion module illustrated in FIG. 3.

FIG. 6 illustrates one exemplary operational flow 600 that may be performed by the outlying node deletion module 316. As shown in FIG. 6, at the beginning of the operational flow 600, a node reliability determination operation 610 determines the reliability of each node in the node group 212. In accordance with one implementation, the node reliability determination operation 610 is performed for each node of the node group.

In accordance with one implantation, the node reliability is determined by dividing the total up time of a node by the total number of outage events that occurred on that node. In accordance with one implementation, the total up time of the node is determined by subtracting the sum of the times between down and up events of all outage events on the node from the total time the node was monitored, as indicated by the event log from the node. The total number of outage events may be determined simply by counting all the outage events in the SEBT for that node.

Following the node reliability determination operation 610, a node group reliability determination operation 612 is then performed. In accordance with one implementation, the node group reliability is determined by summing the total up time of all the nodes, and dividing that total time by the total number of outage events for all the nodes in the node group 212.

Next, a node removal operation 614 removes all outage events from the SEBT that are associated with a node that has a node reliability that is less than a predetermined percentage of the node group reliability. For example, and without limitation, in accordance with one implementation, the outage events for each node that does not have a node reliability that is at least twenty-five percent of the average node group reliability are remove from the SEBT. It is to be understood that term "removing a node" or deleting a node," as used with respect to the outlying node deletion module 316 and the operational flow 600, may mean that the node is simply flagged in the SEBT to ignore in later processes.

Returning now to FIG. 3, in general, the multi-node event burst identification module 318 identifies related single-node event bursts occurring on different nodes of the node group. More particularly, in accordance with one implementation, the multi-node event burst identification module 318 identifies single-node event bursts stored in the SEBT that occur within a predetermined time $t_{mn}$ of one another.

As previously noted, a single-node event burst comprises a defined time period over which one or more outage events (down and up event pair) occur. As such, a single-node event burst may be said to have a start time and an end time. The time between the start and end times of a single-node event burst is said to be the time period of the single-node event burst. As used herein, one single-node event burst is said to overlap another single-node event burst if any portion of the time periods of the single-node event bursts coincide.

A multi-node event burst comprises a defined time period over which two or more single-node event bursts occur. As with the single-node event burst, a multi-node event burst includes a start time, and end time, which define the time period of the multi-node event burst. The beginning time of the multi-node event burst is the earliest occurring down time of all of the single-node event bursts in the multi-node event burst. The ending time of the multi-node event burst is the latest occurring up time of all of the single-node event bursts in the multi-node event burst.

A multi-node event burst timing rule or rules are used to determine which single-node event burst are included in a multi-node event burst. These timing rules may be determined in a number of ways. For example, in accordance with one implementation, a timing rule specifies that all of the single-node event bursts in a multi-node event burst must either have overlapping timing periods, or must occur within a predetermined time $t_{mn}$ from the end of another single-node event burst in the multi-node burst. In the case where the single-node event rules are examined in chronological order, various short cuts can be taken in making this determination, as described below with respect to the operational flow 700.

In general, the multi-node event burst identification module 316 identifies multi-node event bursts in the node group 212 by examining all of the single-node event bursts in the SEBT and determining which of those single-node event burst in the SEBT satisfy the timing rules. The results are then stored in a multi-node event bust table (MEBT) and a cross reference table (MECR). In accordance with one implementation, and without limitation, the MEBT comprises, for each multi-node event burst, a unique identifier for the multi-node event burst, and the start time and end time of the MEBT.

In accordance with one implementation, and without limitation, the MECR comprises a two column mapping table, wherein one row includes unique identifiers for each multi-node event burst (as stored in the MEBT) and the other row includes unique identifiers for each single-node event burst (as stored in the SEBT). As such, each row would include a unique identifier for a multi-node event burst and a unique identifier for a single-node event burst occurring therein. For example, if a given multi-node event burst includes five single-node event bursts, five rows in one column would include the identifier for the multi-node event burst and each of the five associated rows in the other column would include a unique identifier for each of the single-node event bursts in the multi-node event burst.

Certain operational management actions (such as site shutdown, or upgrading of the software of all nodes) on the site may generate large multi-node bursts. Later processes will interpret these events as implying relationships between nodes, thereby skewing later analysis, as these large outages are site specific and not nodal. Therefore to excluded these erroneous activities from future analysis, multi-node bursts containing greater than (N) nodes are excluded from the analysis.

As will be appreciated, there may be a number of ways by which the multi-node event burst identification module 318 may determine which the single-node event bursts satisfy the timing rules for a multi-node event burst. That is, there may be a number of timing rules by which the multi-node event burst identification module 318 may define multi-node event bursts using the single-node event bursts in the SEBT. However, in accordance with one implementation, the multi-node event burst identification module 318 defines multi-node event bursts using the operations set forth in the operational flow 700 shown in FIG. 7, as will now be described.

Figure 7:
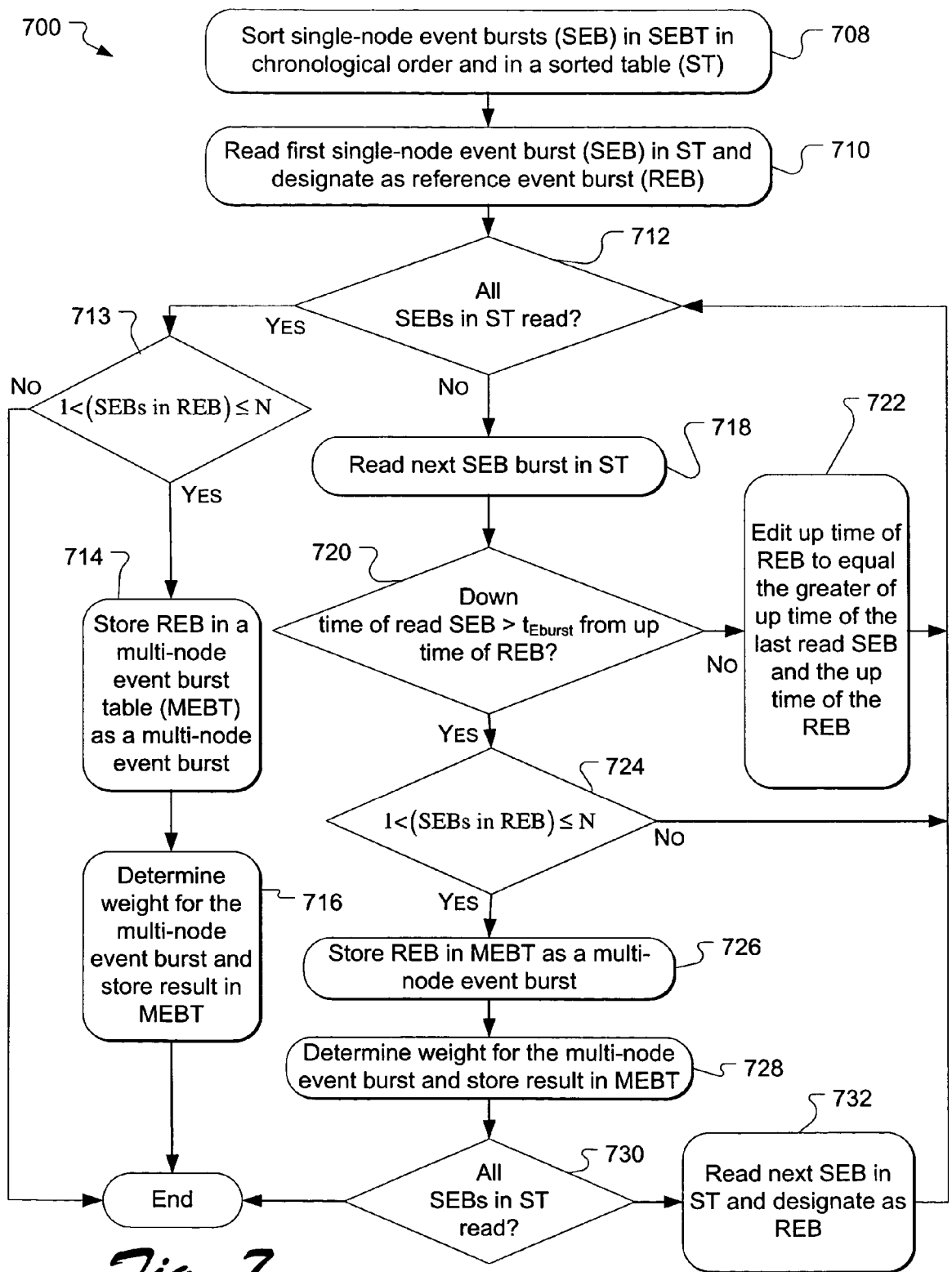
FIG. 7 illustrates an exemplary operational flow including various operations that may be performed by a multi-node event burst identification illustrated in FIG. 3.

As shown in FIG. 7, at the beginning of the operational flow 700, a sort operation 708 combines all of the single-node event burst tables created by the single-node event burst identification module 316 with respect to the nodes of the node group 212 into a table. Put another way, a table is created containing all of the single-node event bursts determined by the single-node event burst identification module 316 with respect to the nodes of the node group 212. This table is then sorted according to the down times of the single-node event bursts, in chronological order. This sorted table (ST) is then used to determine the multi-node event bursts occurring in the node group.

Following the sort operation 708, a read operation 710 reads the first single-node event burst from the ST and designates the extracted single-node event burst as the reference single-node event burst (REB). As used herein, the term "extract" is used to indicate that the single-node event burst is temporarily stored and either removed from the ST or otherwise indicated as having been accessed.

Following the extract operation 710, a determination operation 712 determines whether all of the single-node event bursts in the ST have been read. If it is determined that all of the single-node event bursts in the ST have been read, a count determination operation 713 determines whether the total number of single node event bursts in REB is greater than one (1) and is less than or equal to a predetermined number N. If the total number of single node event bursts in REB is not greater than one (1) or is greater than the predetermined number N, then it is not designated a multi-node event burst, and the operational flow 700 ends. If the total number of single node event bursts in REB is greater than one (1) and is less than or equal to the predetermined number N, a store operation 714 stores the REB in a multi-node event burst table (MEBT) as a multi-node event burst.

In accordance with one implementation N is equal to nine (9). In accordance with other implementations, N may be other numbers, depending on the maximum number of nodes that are determined to be practicable to form a multimode burst.

Following the store operation 714, a strength operation 716 determines the strength of the multi-node event burst and stores the result in the MEBT. In accordance with one implementation, the strength for the multi-node is determined based on, for example and without limitation, whether the burst started with a crash, whether the burst includes a crash, and if the burst does not contain a crash. The operational flow ends following the strength operation 716.

Returning to the determination operation 712, if it is determined therein that all of the single-node event bursts in the ST have not been read, a read operation 718 reads the next single-node event burst in the ST. Following the read operation 718, a timing determination operation 720 determines whether the down time of single-node event burst read in read operation 718 is greater than a predetermined time $t_{mn}$ from the up time of the REB.

If it is determined by the timing determination operation 720 that the down time of the single-node event burst is not greater than the predetermined time $t_{mn}$ from the up time of the REB, an edit operation 722 edits the up time of the REB to equal the greater of the either the single-node event burst read in read operation 718 or the up time of the REB. The operational flow then continues back to the determination operation 712.

If it is determined by the timing determination operation 720 that the time of the single-node event burst is greater than the predetermined time $t_{mn}$ from the up time of the REB, a count determination operation 724 determines whether the total number of single-node event burst in the REB is greater than 1 and less than or equal to a predetermined number N of single node event bursts.

If the total number of nodes in REB is not greater than 1 or the total number of nodes in REB is greater than N, the operational flow 700 returns to the determination operation 712. If the total number of nodes in REB is greater than 1 and is less than or equal to N, a store operation 726 stores the REB in the MEBT as a multi-node event burst. A strength operation 728 then determines a strength for the multi-node event burst and stores the result in the MEBT. The strength operation 728 determines the strength for the multi-node event burst in the same manner as the strength operation 716, previously described.

Following the weighting operation 728, a determination operation 730 determines whether all of the single-node event bursts in the ST have been read. If it is determined that all of the single-node event bursts in the ST have not been read, the operational flow returns to the determination operation 712. If, however, it is determined that all of the single-node event bursts in the ST have been read, the operational flow 700 ends.

Following the operational 700, the MEBT will include a list of all of the multi-node event bursts that have occurred in the node group.

Returning now to FIG. 3, after the multi-node event bursts for the node group have been determined, the node relationship determination module 320 determines the strength of relationships between the various nodes. In accordance with one implementation, the node relationship determination module 320 determines relationship strength values according to various rules. More particularly, the node relationship determination module 320 determines relationship strength for each unique set of two nodes. The node relationship determination module 320 may use any number of rules to determine relationship strength values for node, In accordance with one implementation, the node relationship determination module 320 uses three different rules to determine three relationship strength values for each unique set of two nodes, as will now be described with respect to operational flows 800, 900, and 1000 in FIGS. 8, 9, and 10, respectively. However, it should be understood that the node relationship determination module 320 is not limited to the rules embodied in operational flows 800, 900, and 1000. Additionally, it should be understood that it is contemplated that various rules may added or removed from use by the node relationship determination module 320.

Figure 8:
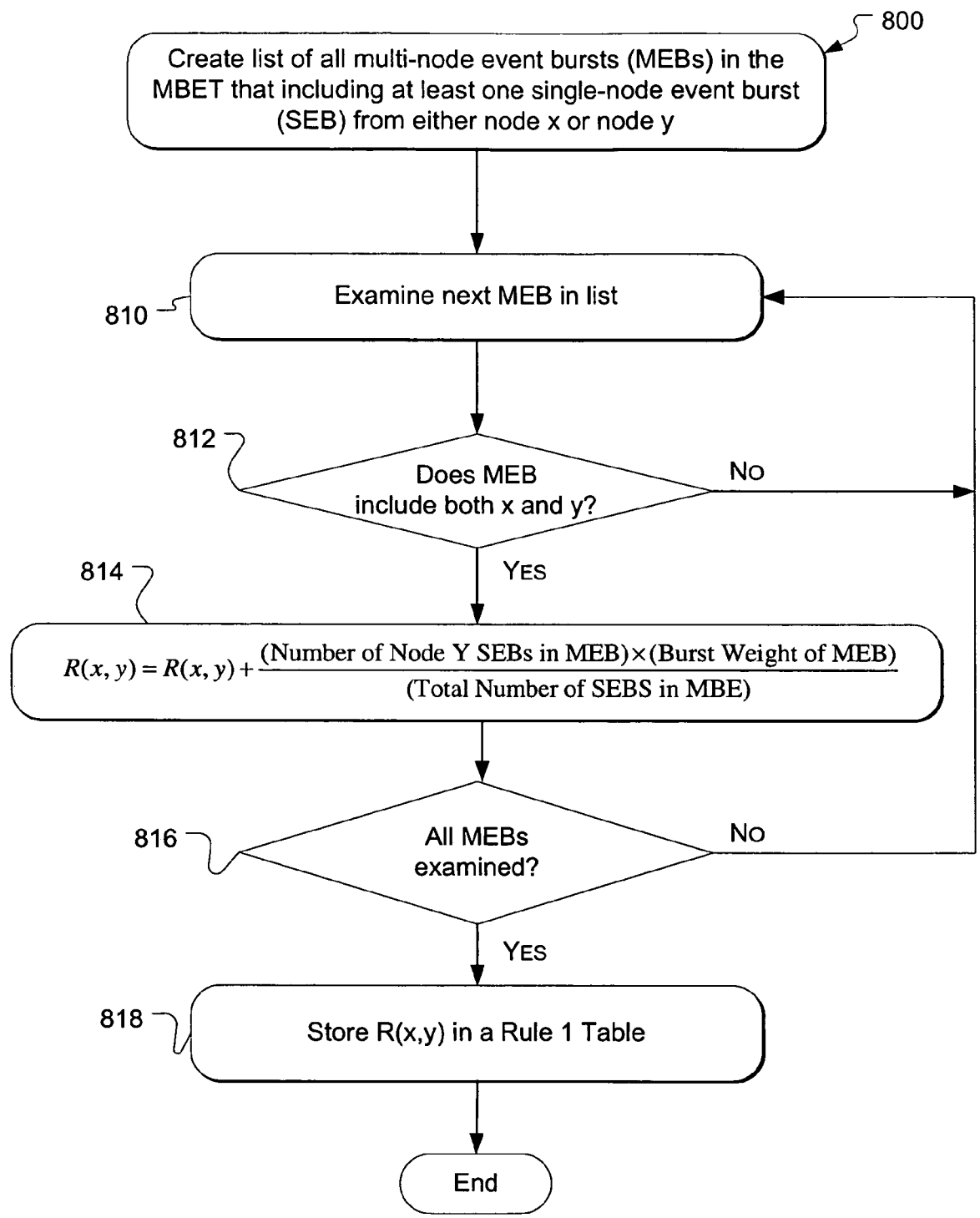
FIG. 8 illustrates an exemplary operational flow including various operations that may be performed by a node relationship determination module illustrated in FIG. 3.

FIG. 8 illustrates an operational flow 800 for a first rule (Rule 1) that may be employed by the node relationship determination module 320 to determine a relationship strength values between pairs of nodes. In accordance with one implementation, the operational flow 800 is carried out for each combination of nodes x and y represented in the MBET.

As shown, at the beginning of the operational flow 800, a create operation 810 creates a list including all multi-node event burst in the MBET that include at least one single-node event burst from either node x or node y. Next, an examination operation 812 examines the next multi-node event burst in the list. In this case, the multi-node event burst examined by examination operation 812 will be the first multi-node event burst in the list.

Following the examination operation 810, a determination operation 814 determines whether the multi-node event burst examined in examination operation 812 includes a multi-node event burst that includes single-node event bursts from both node x and node y. If the multi-node event burst does not include a single-node event bursts from both node x and node y, the operational flow returns to the examination operation 812. If, however, the multi-node event burst does include a single-node event bursts from both node x and node y, a rule operation 816 then computes a relationship strength value (R(x,y)) for nodes x and y. The rule operation is shown in rule operation 816 as equation R(x,y). As shown, the rule operation 816 includes therein a summation symbol preceding a quotient. This summation symbol indicates that the quotient computed for each multi-node event burst in the operational flow will be summed to produce the relationship strength value R(x,y).

Next, a determination operation 818 determines whether all multi-node event bursts in the list have been examined. If it is determined that all multi-node event bursts in the list have not been examined, the operational flow 800 returns to examination operation 812. If, however, it is determined that all multi-node event bursts in the list have been examined, a store operation 820 stores the relationship strength value in a rule table (Rule 1 table). The operational flow then 800 then ends.

Figure 9:
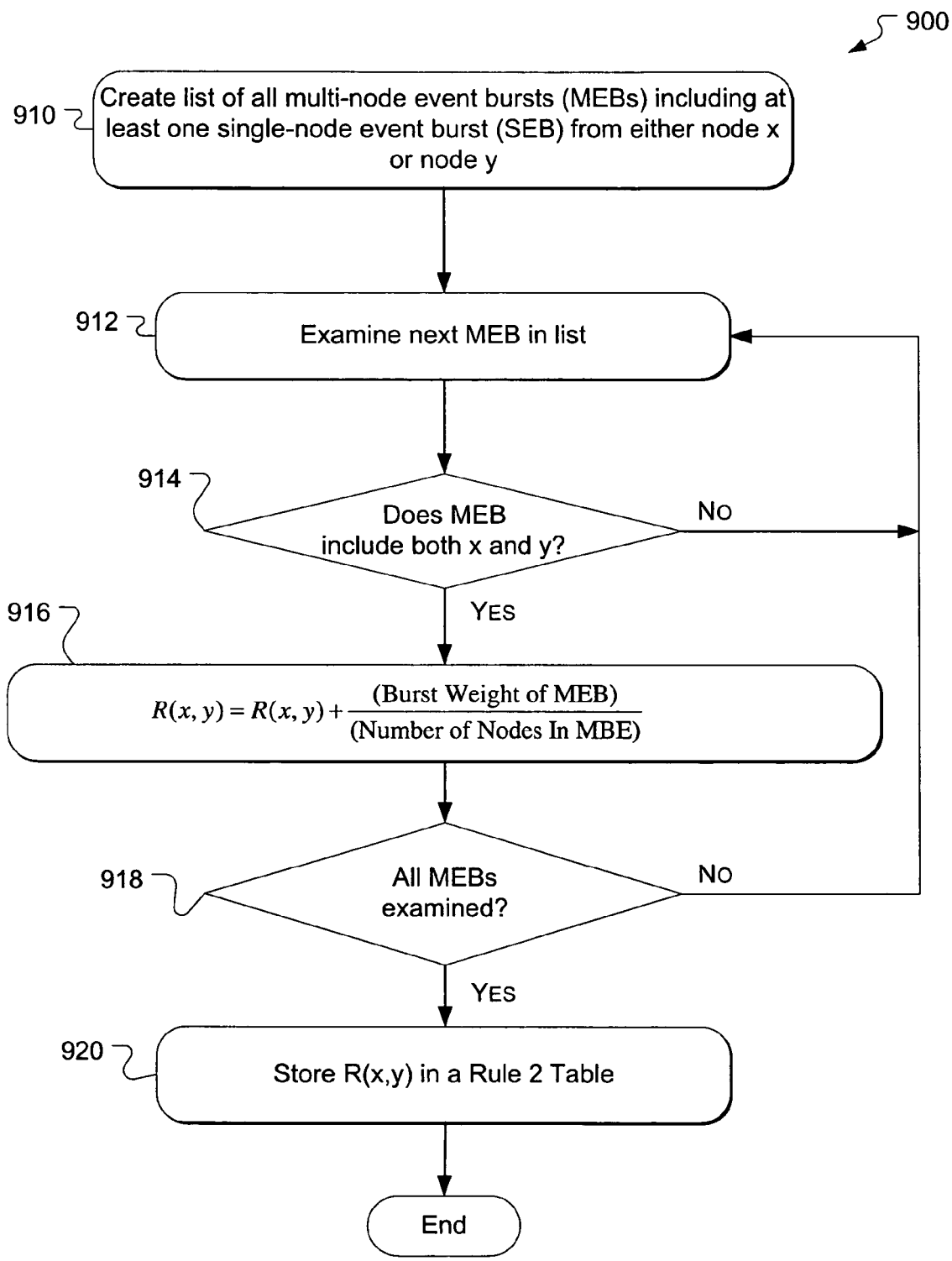
FIG. 9 illustrates an exemplary operational flow including various operations that may be performed by a node relationship determination module illustrated in FIG. 3.

FIG. 9 illustrates operational flow 900 for a second rule (Rule 2) that may be employed by the node relationship determination module 320 to determine strength of relationship values between pairs of nodes. As with the operational flow 800, the operational flow 900 is carried out for each combination of nodes x and y represented in the MBET.

As shown, at the beginning of the operational flow 900, a create operation 910 creates a list including all multi-node event burst in the MBET that include at least one single-node event burst from either node x or node y. Next, an examination operation 912 examines the next multi-node event burst in the list. In this case, the multi-node event burst examined by examination operation 912 will be the first multi-node event burst in the list.

Following the examination operation 910, a determination operation 914 determines whether the multi-node event burst examined in examination operation 912 includes multi-node event bursts that includes a single-node event bursts from both node x and node y. If the multi-node event burst does not include a single-node event bursts from both node x and node y, the operational flow returns to the examination operation 912. If, however, the multi-node event burst does include a single-node event bursts from both node x and node y, a rule operation 916 then computes a relationship strength value for nodes x and y. The rule operation is shown in rule operation 916 as equation $R(x,y)$.

Next, a determination operation 918 determines whether all multi-node event bursts in the list have been examined. If it is determined that all multi-node event bursts in the list have not been examined, the operational flow 900 returns to examination operation 912. If, however, it is determined that all multi-node event bursts in the list have been examined, a store operation 920 stores the determined relationship strength value in a rule table (Rule 2 table). The operational flow then 900 then ends.

Figure 10:
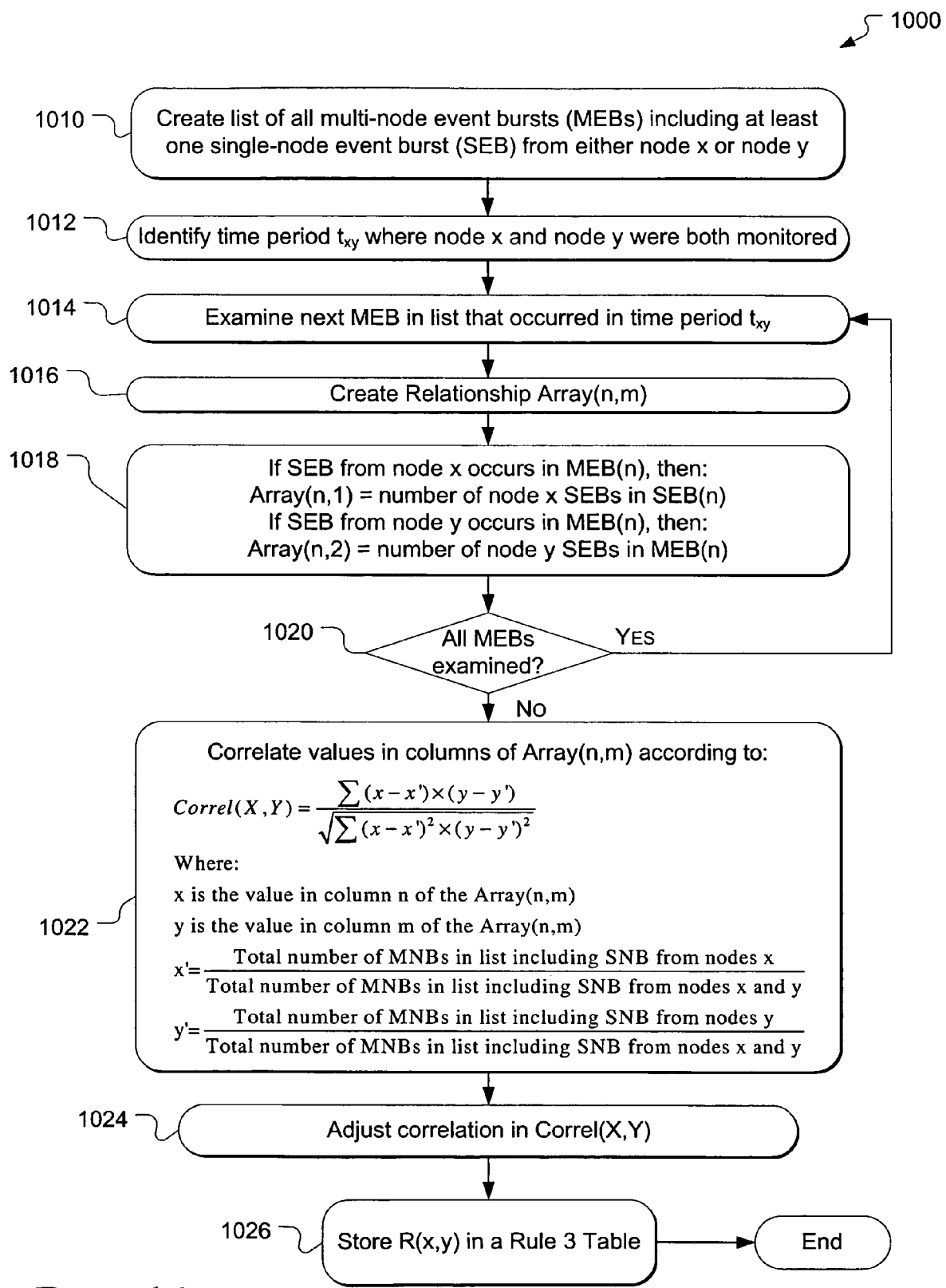
FIG. 10 illustrates an exemplary operational flow including various operations that may be performed by a node relationship determination module illustrated in FIG. 3.

FIG. 10 illustrates operational flow 1000 for a third rule (Rule 3) that may be employed by the node relationship determination module 320 to determine strength of relationship values between pairs of nodes. As with the operational flows 800 and 900, the operational flow 1000 is carried out for each unique combination of nodes x and y represented in the MBET.

As shown, at the beginning of the operational flow 1000, a create operation 1010 creates a list including all multi-node event burst in the MBET that include at least one single-node event burst from either node x or node y. Next, a timing operation 1012 determines a monitoring time period where both node x and node y were monitored. As previously noted, the monitoring time of each node is stored in the ET created by the cleansing module.

Following the timing operation 1012, an examination operation 1014 examines the next multi-node event burst in the list that occurred within the time period determined in the timing operation. In this case, the multi-node event burst examined by examination operation 1012 will be the first multi-node event burst in the list.

Next, an array creation operation 1016 creates a two dimensional array Array(n,m), where the rows of the correspond to an multi-node event burst examined by the examination operation 1014, the first row corresponds to node x, and the second row corresponds to node y. Following the array creation operation 1016, an array population operation 1018 populates Array(n,m). In accordance with one implementation, the populate array operation 1018 populates the array created in the array creation operation 1016 as follows: if the multi-node event burst being examined includes a single-node event burst from node x, Array(n,1)=1, if the multi-node event burst being examined includes a single-node event burst from node y, Array(n,2)=1.

Following the populate array operation 1018, a determination operation 1020 determines whether all multimode event burst in the list have been examined by the examination operation 1014. If it is determined that all multimode event burst in the list have not been examined by the examination operation 1014, the operational flow 1000 returns to the examination operation 1014. If, however, it is determined that all multimode event burst in the list have been examined by the examination operation 1014, the operational flow 1000 proceeds to a correlation operation 1022. At this point in the operational flow, The Array(n,m) will be complete.

In general, the correlation operation 1022 determines a correlation between node x and node y. As will be appreciated, the correlation between node x and node y may be determined in a number of ways. For example, and without limitation, in accordance with one implementation the correlation operation 1022 determines the correlation between node x and node y using the Array(n,m). In general, the correlation identifies the closeness of the behaviour of node x and node y. If node x and node y always exist in the same multi-node event burst, the correlation between node x and node y is 1. Conversely, if node x and node y do not exist in any of same multi-node event bursts, then the correlation between node x and node y is 0.

In accordance with one implementation the correlation operation 1022 determines the correlation between node x and node y using the correlation equation (Correl(X,Y)), shown in FIG. 10. As shown, Correl(X,Y) produces a single correlation value for x and y, for each pair of nodes represented in the Array(n,m).

Following the correlation operation 1022, a correlation adjustment operation 1024 adjusts the correlation values determined in correlation operation 1022 to take into account that amount of time both node x and node y are monitored. In accordance with one implementation, correlation adjustment operation 1024 adjusts the correlation values by multiplying the correlation values by a reliability coefficient. (Adjusted Coefficient=Correl(X,Y)*(Reliability Coefficient) Where the reliability coefficient equals the length of the time period where both node x and node y were simultaneously monitored, divided by the total monitoring time of the node group 212. If the adjusted coefficient is a negative number, the correlation adjustment operation 1024 sets R(x,y) equal to zero (0). If the adjusted coefficient is not a negative number, the correlation adjustment operation 1024 sets the relationship value R(x,y) equal to the adjusted coefficient.

Next, a store operation 1026 stores all of the node relationship values R(x,y) for each set of nodes in a rule table (Rule 3 table). The operational flow 1000 then 1000 then ends. As will be appreciated, flowing the completion of the operational flow 1000, Rule 3 table will include relationship strength values for each unique pair of nodes x and y represented in the MBET Returning now to FIG. 3, after the node relationship determination module 320 has created rules tables for each rule, the relationship normalization module 322 normalizes and weights the relationship strength values in each of the rule tables. In accordance with one implementation, the relationship normalization module 322 normalizes and weights the relationship strength value in accordance with the operation flow 1100, shown in FIG. 11. It should be understood that the operational flow will be applied to each rule table created by the node relationship determination module 320.

Figure 11:
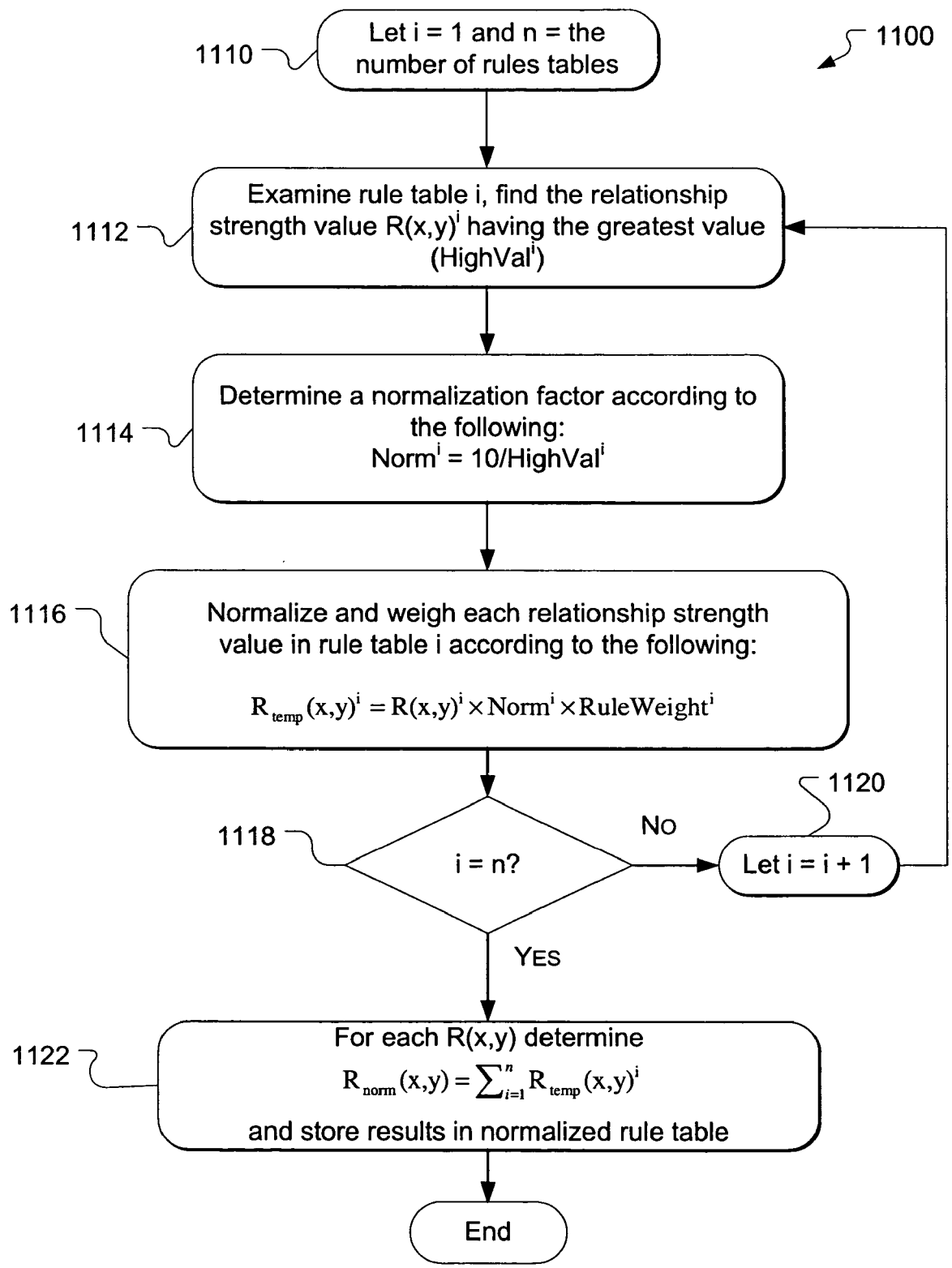
FIG. 11 illustrates an exemplary operational flow including various operations that may be performed by a relationship normalization module illustrated in FIG. 2.

As shown in FIG. 11, at the beginning of the operation flow 1100 an initialize variables operation 1110 sets i=1 and n=the number of rules tables. Next, an examination operation 1112 examines each relationship strength value $R(x,y)^i$ in the rule table i to determine the relationship strength value having the highest value (HighVal$^i$). As used with respect to the operational flow 1100, the superscript i indicates that the value or variable having the superscript is either from, or related to, table number i.

Next, a normalization factor operation 1114 determines a normalization factor for the table i according to the following equation: Norm$^i$=10/HighVal$^i$. Once the normalization factor has been determined, a normalize operation 1116 determines a temporary relationship strength value $R_{temp}(x,y)^i$ for each $R(x,y)^i$ in the rule table i by multiplying each relationship strength value $R(x,y)^i$ by the normalization factor (Norm$^i$) and a rule weight (RuleWeight$^i$). In accordance with one implementation, RuleWeight$^i$ is a variable that may be set by a user for each rule, which indicates the relevant importance of each rule to the user.

Following the normalization operation 1116, determination operation determines whether the variable i is equal to the number of rules tables (n). If the variable i is not equal to n, an increment operation 1120 increments i and the operational flow returns to the examination operation 1112. If the variable i is equal to n, a store operation 1122 then adds the relationship strength values $R_{temp}(x,y)$ for each $R_{temp}(x,y)$, as shown in 1122, and stores the results in a normalized rule table (NRT).

Returning now to FIG. 3, after the relationship normalization module 322 has created a normalized relationship table (NRT) for each rule, the relationship adjustment module 324 adjusts each normalized relationship strength value based on the similarity if the names of the nodes to which the normalized relationship strength value applies. Each of the adjusted relationship strength values for a given NRT is then stored in a final relationship table (FRT).

Figure 12:
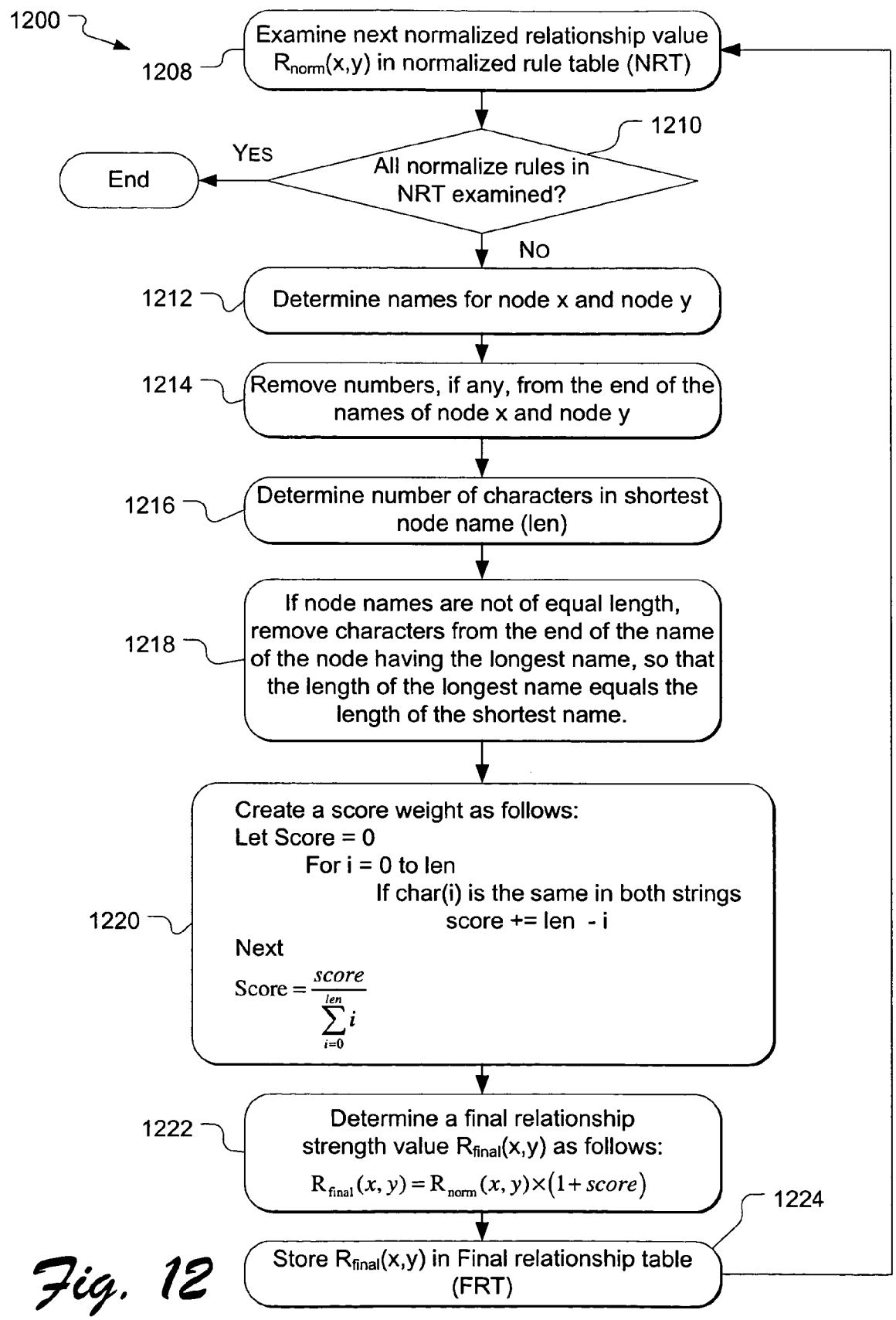
FIG. 12 illustrates an exemplary operational flow including various operations that may be performed by a relationship adjustment module illustrated in FIG. 3.

In accordance with one implementation, and without limitation, relationship adjustment module 324 creates each FRT in accordance with the operational flow 1200 illustrated in FIG. 12. As shown in FIG. 12, at the beginning of the operational flow 1200 an examination operation 1208 identifies the next node pairs where the normalized relationship is greater than 0. The process extracts the names for both nodes and also extracts the normalized relationship value $R_{norm}(x,y)$ in the NRT.

Next, a determination operation 1210 then determines if all of the normalized relationship strength values in the NRT have been examined. If all of the normalized relationship strength values in the NRT have been examined, the operational flow 1200 ends. If, however, all of the normalized relationship strength values in the NRT have not been examined, continues to a name determination operation 1212, which name determination operation determines the names of the node x and node y represented by the normalized relationship value 1212. A remove numbers operation 1214 then removes any numbers from the ends of the names for node x and node y. A character number determination then determines the number of characters in the shortest name (after the numbers have been removed). If names nodes x and y do not have the same number of characters after the remove numbers operation 1214, a name adjustment operation 1218 then, remove characters from the end of the name of the node having the longest name, so that the length of that node equals the length of the node with the shortest name.

Next, a name scoring operation 1220 determines a score (Score) for each of the names in the manner shown in the name scoring operation 1220 of FIG. 12. A final relationship strength operation 1222 then determines a final relationship strength value for the normalized relationship value $R_{final}(x,y)$ currently being examined by multiplying $R_{norm}(x,y)$ by (1+Score). A store operation 1224 then stores the final relationship strength value determined in the final relationship strength operation 1222 to a final relationship table, and the operational flow 1200 returns to the determination operation 1210.

It should be appreciated that, in general, the operations 1214-1220, assigns a weighting value (score) that is the measure of the similarity of the names of node x and node y. It will be appreciated by those skilled in the art that the determination of such a score may created in a number of ways and by a number of functions or algorithms. As such, it is contemplated that in other implementations, the weighting value (score) determined by operations 1214-1220 may be determined in these other ways.

Returning now to FIG. 3, after the relationship adjustment module 324 has created a final relationship table (NRT) for each rule, a cluster identification module 326 then determines which nodes in the node group are members of a node cluster. In general, a node cluster is a group of nodes in the node group that are related in some manner according to their outage events. Each node in a node group is said to be a member of the node group. The nodes in a cluster are selected according to one or more predefined rules, algorithms and/or operational flows. It may then be said that the cluster identification module 326 employs or embodies one or more of these predefined rules, algorithms and/or operational flows.

In accordance with one implementation, the cluster identification module 326 defines or selects the members of a node group according to the relative strength of relationships between the perspective members of the node group. In accordance with another embodiment, the cluster identification module 326 defines or selects the members of a node group according to whether nodes have some relationship between their outage events (e.g. nodes having outage events in a common multi-node event burst, etc,) In accordance with other implementations, the cluster identification module 326 may use both relative strength of relationships between nodes and whether nodes have some relationship between their outage events to define or select the members of a node group.

Figure 13:
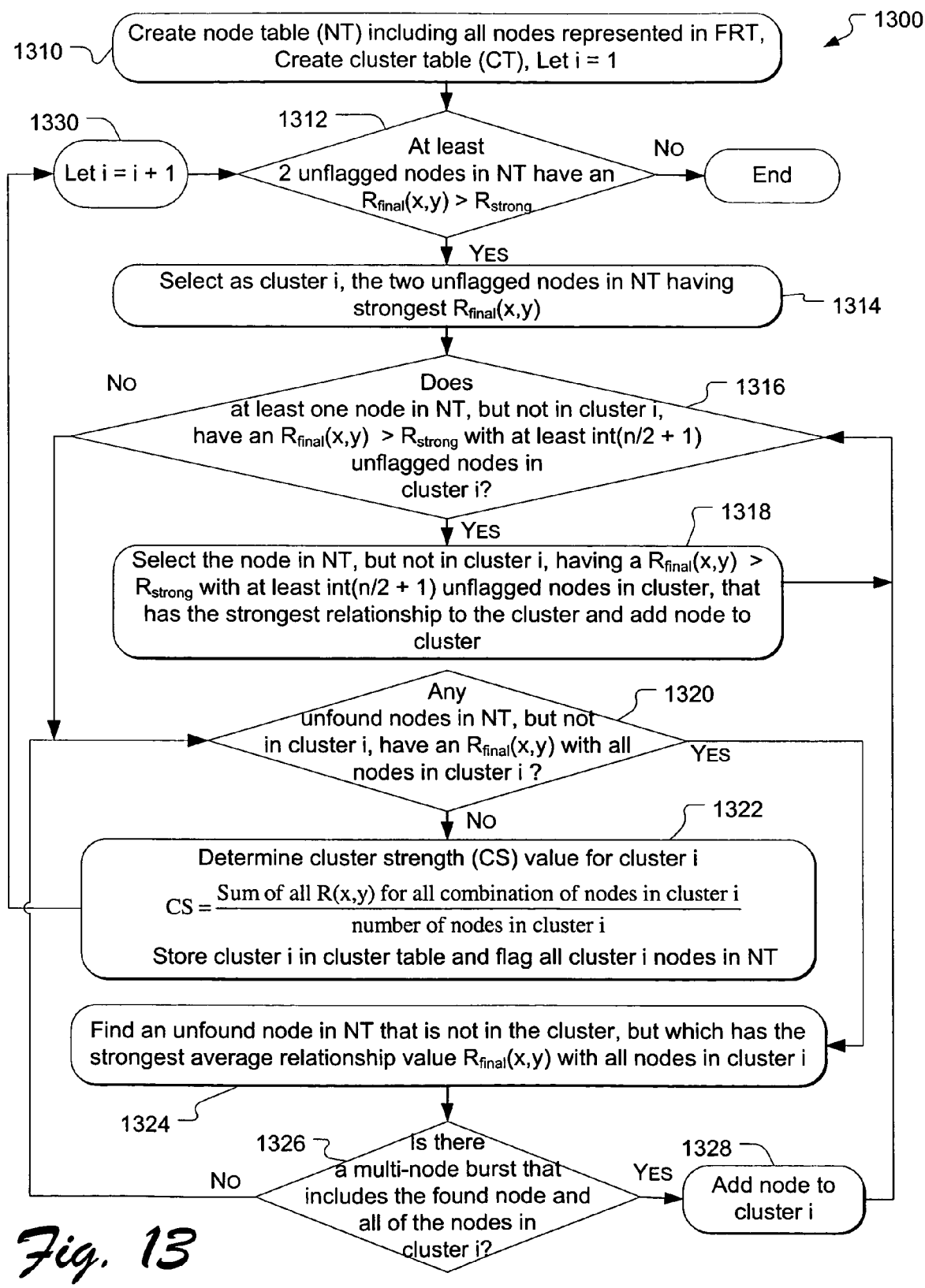
FIG. 13 illustrates an exemplary operational flow including various operations that may be performed by a cluster identification module illustrated in FIG. 3.

As will be appreciated, these various factors may be arranged and combines in numerous ways to create rules, algorithms and/or operational flows for defining or selecting the members of a node group. For example, and without limitation, in accordance with one exemplary implementation, the cluster identification module 326 selects the members of node groups according to the operational flow 1300 illustrated in FIG. 13.

As shown, at the beginning of the operational flow 1300, a create operation 1310 creates a node table (NT) including a number of relationship strength values for pairs of node. For example, in accordance with one implementation, the create operation 1310 creates a node table including the all of the nodes having relationship strength values represented in the final relationship table (FRT). Additionally, the create operation 1310 creates a cluster table (CT) for identifying clusters and their member nodes. Also, the initializes a counter variable i to 1.

Following the create operation 1310, a starting nodes determination operation 1312 determines whether there are at least two unflagged nodes in the NT that have a relationship strength to one another $R_{final}(x,y)$ that is greater than a predetermined value ($R_{strong}$). As explained below, once a cluster is defined, all if its nodes are flagged in the NT as belonging to a cluster in the CT. The value $R_{strong}$ may be determined in a number of ways. For example, and without limitation. in accordance with one implementation, $R_{strong}$ comprises the average relationship value of all relationship values in the FRT.

If it is determined that there are not at least two unflagged nodes in the NT that have an $R_{final}(x,y)$ that is greater than $R_{strong}$, the operational flow 1300 ends. However, if it is determined that there are at least two unflagged nodes in the NT that have an $R_{final}(x,y)$ that is greater than $R_{strong}$, a select operation 1314 selects the two unflagged nodes in the NT having the greatest $R_{final}(x,y)$.

Next, a strongly related node determination operation 1316 determines whether at least one node in the NT, but not in cluster i, has a relationship strength value $R_{final}(x,y)$ greater than $R_{strong}$ with at least int(n/2+1) unflagged nodes in the cluster i. Stated another way, the strongly related node determination operation 1316 determines if there is at least one node in the NT that is not in cluster i, that has a relationship strength value with at least int(n/2++1) unflagged nodes in the cluster i, and wherein the relationship strength values $R_{final}(x,y)$ between the one node and each of the at least int(n/2+1) unflagged nodes is greater than $R_{strong}$. As used here, n equals the number of nodes in the cluster and int(n/2+1) is the integer value of (n/2+1). For example, if the cluster i includes two nodes, n/2+1=2.5, and int(n/2+1)=2.

If it is determined that at least one node in the NT, but not in cluster i, has a relationship strength value $R_{final}(x,y)$ greater than $R_{strong}$ with at least int(n/2+1) unflagged nodes in the cluster i, the operational flow continues to a select operation 1318. The select operation 1318 selects the one of the nodes in the NT, but not in cluster i, that have a relationship strength value $R_{final}(x,y)$ greater than $R_{strong}$ with at least int(n/2+1) unflagged nodes in the cluster i, that has the greatest relationship to the cluster i, and adds the selected node to the cluster i.

The manner in which the select operation 1318 determines the relational strength of a node (target node) relative to a cluster is by determining the average relational strength value between the target node and each of the nodes in the cluster. That is, the relational strength values are determined for the target node and each of the nodes in the cluster R(target node, y). These relational strength values are than summed and divided by the total number of nodes in the cluster to produce the average relational strength value.

Following the select operation 1318, the operational flow 1300 returns to the strongly related node determination operation 1316.

If it is determined at determination operation 1316 that there is not at least one node in the NT, but not in cluster i, has a relationship strength value $R_{final}(x,y)$ greater than $R_{strong}$ with at least int(n/2+1) unflagged nodes in the cluster i, the operational flow continues to determination operation 1320. The determination operation 1320 determines if any unfound nodes in the NT, but not in cluster i, have a relationship strength value $R_{final}(x,y)$ with all of the nodes in cluster i. As used herein, an unfound node is a node that was not found by the find node operation 1324 described below.

If it is determined that there are not any unfound nodes in the NT, but not in cluster i, that have a relationship strength value $R_{final}(x,y)$ with all of the nodes in cluster i, an add cluster operation 1322 determines a cluster strength (CS) value for the cluster i and stores the cluster i and CS value in the CT. Additionally, the add cluster operation 1322 flags all nodes in cluster i in the NT.

The manner in which the add cluster operation 1322 determines the CS may vary. However, in accordance with one implementation, and without limitation, the CS value is determined as shown in operation 1322.

Following the cluster operation 1322, an increment operation 1330 increments the counter variable i, and the operational flow returns to the starting nodes determination operation 1312.

If it is determined at determination operation 1320 that there is at least one unfound nodes in the NT, but not in cluster i, that has a relationship strength value $R_{final}(x,y)$ with all of the nodes in cluster i, a find node operation 1324 finds the unfound node in NT that is not in the cluster i, but which has a the strongest relationship $R_{final}(x,y)$ with all of the nodes in cluster i.

Following the find node operation 1324, a determination operation 1326 determines if there is a multi-node burst that includes the found node and all of the nodes in cluster i. If there is not a multi-node burst that includes the found node and all of the nodes in cluster i, the operational flow returns to determination operation 1320. If there is a multi-node burst that includes the found node and all of the nodes in cluster i, an add operation adds the node to node cluster i, and the operational flow returns to the strongly related node determination operation 1316.

Returning now to FIG. 3, after the cluster identification module 326 has created the cluster table, a cluster behavior measurement module 328 then uses the information contained therein, together with other information, to measure various metrics of the clusters. These cluster metrics are then stored in a cluster metrics table.

Figure 14:
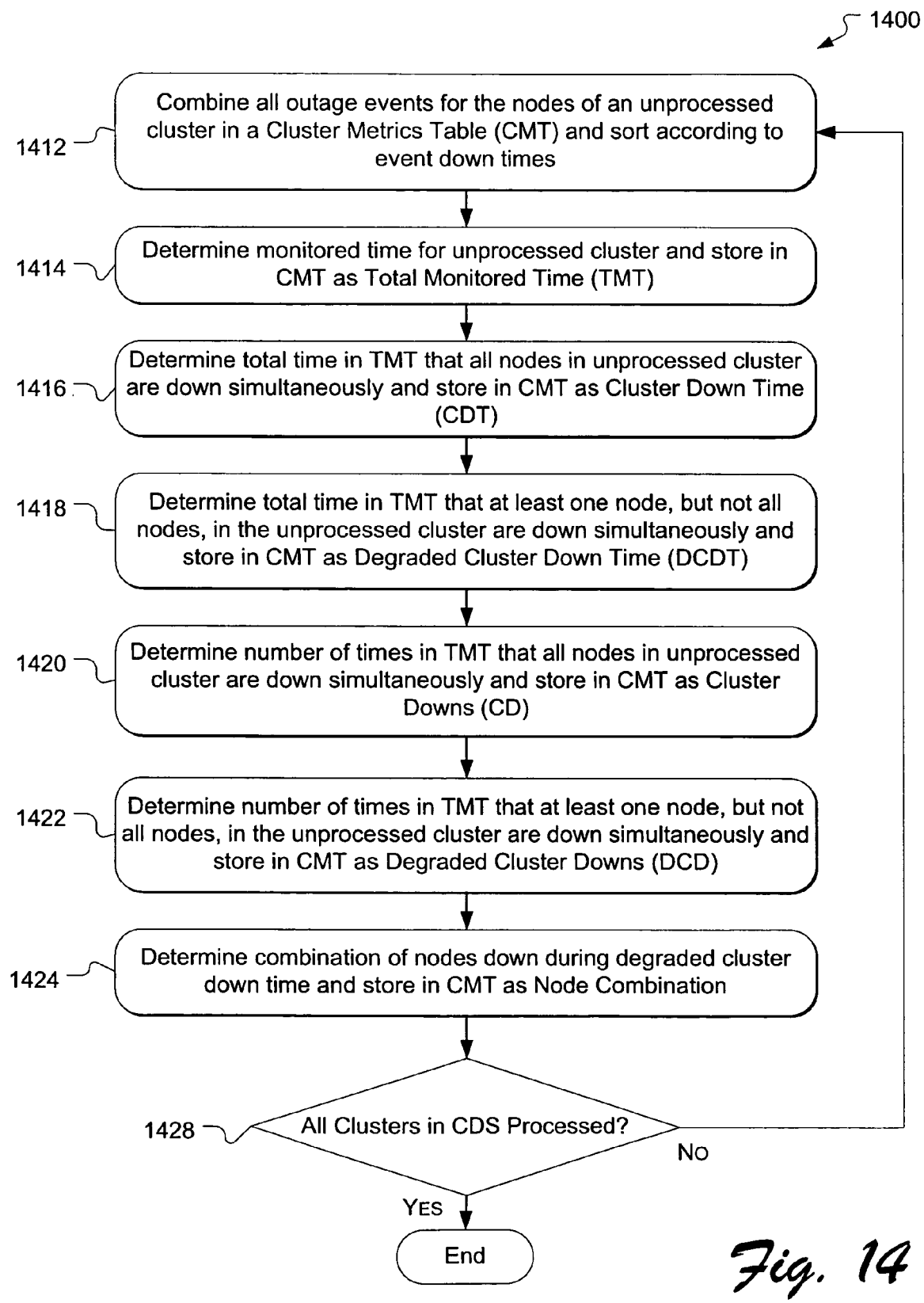
FIG. 14 illustrates an exemplary operational flow including various operations that may be performed by a cluster behavior measurement module illustrated in FIG. 3.

A number of exemplary cluster metrics, and the manner in which they may be determined by the cluster behavior module 328, are illustrated in the operational flow 1400 shown in FIG. 14. The operational flow 1400 is performed for each of the clusters of the cluster table created by the cluster identification module 326.

As shown in FIG. 1400, at the beginning of operational flow 1400, a cluster processing operation 1412 combines all outage events for the nodes of a cluster represented in the cluster table that has not previously been processed by the cluster processing operation 1412. The cluster processing operation 1412 also sorts the outage events according to event down times.

Next, a determine monitored time operation 1414 determines monitored time for the cluster processed in the cluster processing operation 1412 and stores the determined time as total monitored time (TMT) in a cluster metrics table (CMT).

A determine total time operation 1416 determines the total time in the TMT that all nodes in the cluster are down simultaneously and stores the determined total time in the CMT as cluster down time (CDT). Another determine total time operation 1418 determines the total time in the TMT that at least one node, but not all nodes, in the unprocessed cluster are down simultaneously and stores the total time in the CMT as a degraded cluster down time (DCDT).

A determine number operation 1420 determines a number of times in the TMT that all nodes in the cluster are down simultaneously and stores the number in the CMT as cluster downs (CD). Another determine number operation 1422 determines a number of times in TMT that at least one node, but not all nodes, in the unprocessed cluster are down simultaneously and stores the number in the CMT as degraded cluster downs (DCD).

A determine combination operation 1424 determines a combination of nodes that were down during the degraded cluster down time and stores the combination of nodes in the CMT as node combination (NC).

A determination operation 1428 determines whether all clusters in the CMT have been processed by the processing operation 1412. If it is determined that all clusters in the CMT have not been processed, the operation flow 1400 returns to the combine operation 1412. If, however, it is determined that all clusters in the CMT have been processed, the operational flow 1400 ends.

Returning now to FIG. 3, after the cluster interpretation module 328 has created the cluster metrics table (CMT), a cluster interpretation module 330 then uses the information contained therein, together with other information, to measure determine various characteristics of the clusters. These cluster characteristics are then stored in a cluster characteristics table (CCT) and reported to a user.

Figure 15:
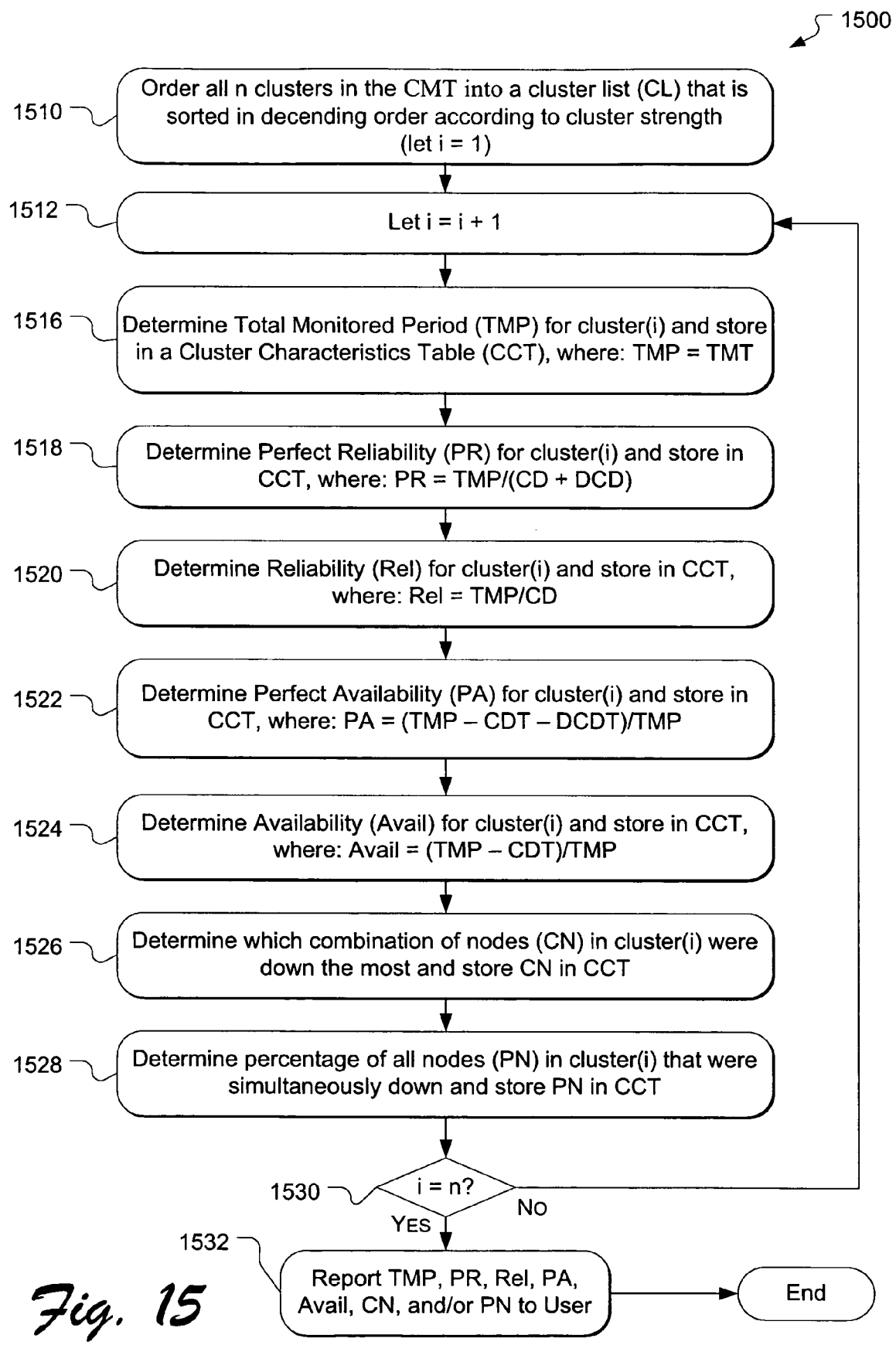
FIG. 15 illustrates an exemplary operational flow including various operations that may be performed by a cluster interpretation module illustrated in FIG. 3.

A number of exemplary cluster characteristics, and the manner in which they may me determined by the cluster interpretation module 330, are illustrated in the operational flow 1500 shown in FIG. 15.

As shown, at the start of the operational flow 1500, an ordering operation 1510 orders all of the clusters in descending order into a cluster list according to cluster strength. As noted earlier, the cluster strengths were determined by the multi-node burst identification module 318 and stored in the MEBT. Next, an initialization operation 1512 initializes a counter variable, i, to one (1).

Following the initialization operation 1512, a total monitoring period operation 1516 determines the total monitored period (TMP) for cluster i and stores the TMP in the CCT. In one implementation of the total monitoring period operation 1516, the TMP is set equal to the TMT for cluster i in the CMT. TMP=TMT this box not needed can discuss on phone but my fault.

A perfect reliability operation 1518 determines a perfect reliability value (PR) for cluster i and stores the PR in the CCT. One implementation of the perfect reliability operation 1518 calculates the PR according to the equation PR=TMP/(CD+DCD).

A reliability operation 1520 determines the reliability (Rel) for cluster i and stores the Rel in the CDEMS. In one implementation of the reliability operation 1520, the Rel is calculated using the equation Rel=TMP/CD.

A Perfect Availability operation 1522 determines a perfect availability (PA) value for cluster i and stores the PA value in the CCT. In accordance with one implementation of the perfect availability operation 1522, the PA value is calculated using the equation PA=(TMP−CDT−DCDT)/TMP.

A cluster availability operation 1524 determines cluster availability (Avail) value for cluster i and stores the cluster availability value in the CCT. In accordance with one implementation of the cluster availability operation 1524, the cluster availability is calculated according to the equation: Avail=(TMP−CDT)/TMP.

A node combination operation 1526 determines which combination of nodes (CN) in cluster i were down the most and stores the CN in the CCT. A percentage computation operation 1528 then determines a percentage of all nodes (PN) in the cluster i that were simultaneously down and stores the PN in the CCT.

A determination operation 1530 determines whether the counter variable i equals the total number clusters in the cluster list. If it is determined that the counter variable is equal to the total number of clusters, the operational flow 1500 returns to the initialization operation 1512, which increments i to the next cluster in the cluster list. If, however, the determination operation 1520 determines that i is equal to the total number of clusters in the cluster list, the operational flow 1500 branches to a reporting operation 1532.

The reporting operation 1532 reports some or all of the TMP, PR, Rel, PA, Avail, CN, and/or PN to a user, such as a system administrator. As will be appreciated, there are a number of ways in which these values can be delivered or presented to a user.

After the reporting operation 1532, the operational flow ends.

Figure 16:
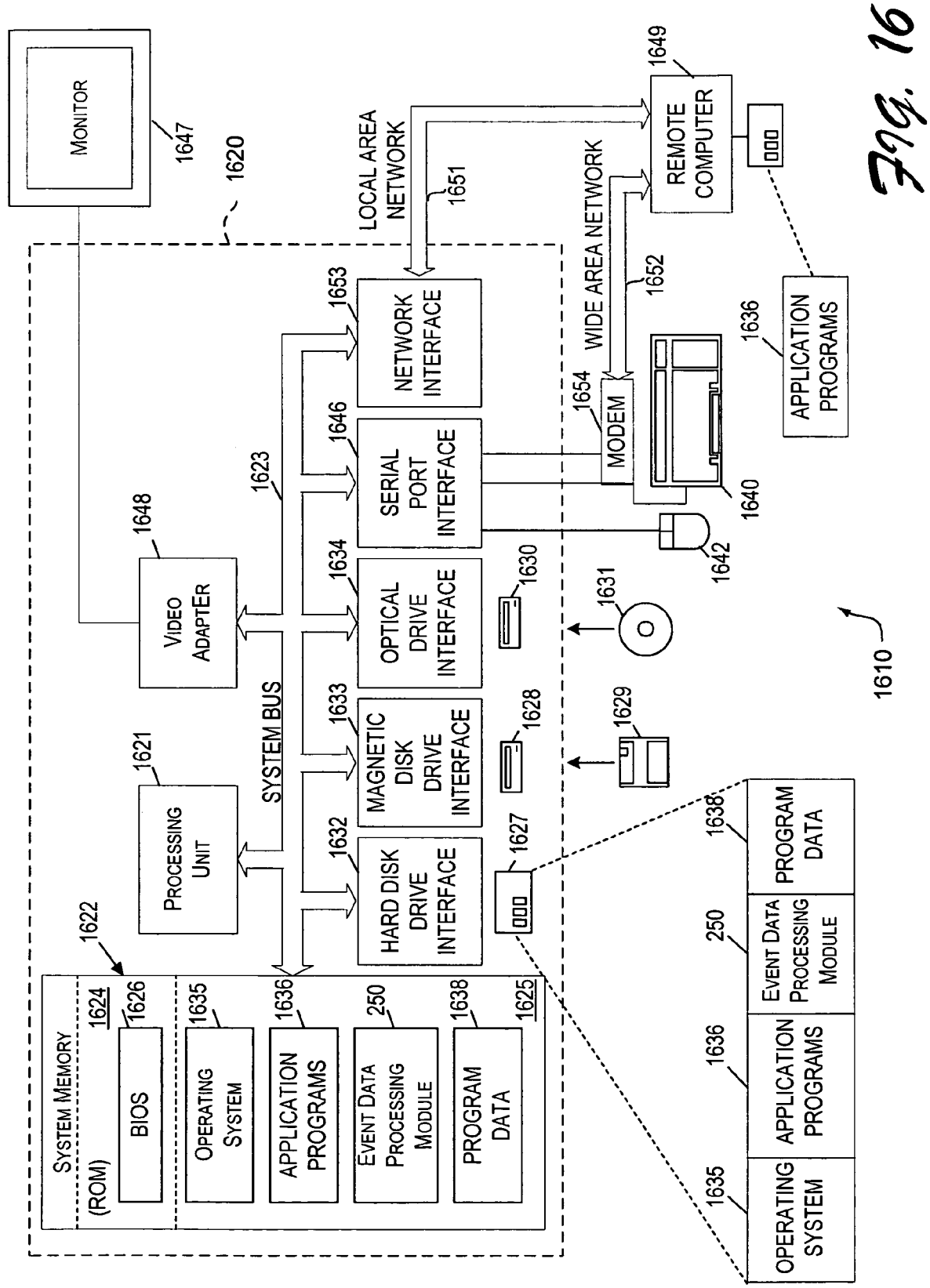
FIG. 16 illustrates an exemplary computer system in which the systems and methods described herein may be implemented.

FIG. 16 illustrates one exemplary computing environment 1610 in which the various systems, methods, and data structures described herein may be implemented. The exemplary computing environment 1610 is only one example of a suitable computing environment and is not intended to suggest any limitation as to the scope of use or functionality of the systems, methods, and data structures described herein. Neither should computing environment 1610 be interpreted as having any dependency or requirement relating to any one or combination of components illustrated in computing environment 1610.

The systems, methods, and data structures described herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary operating environment 1610 of FIG. 16 includes a general purpose computing device in the form of a computer 1620, including a processing unit 1621, a system memory 1622, and a system bus 1623 that operatively couples various system components include the system memory to the processing unit 1621. There may be only one or there may be more than one processing unit 1621, such that the processor of computer 1620 comprises a single central-processing unit (CPU), or a plurality of processing units, commonly referred to as a parallel processing environment. The computer 1620 may be a conventional computer, a distributed computer, or any other type of computer.

The system bus 1623 may be any of several types of bus structures including a memory bus or memory controller, a peripheral bus, and a local bus using any of a variety of bus architectures. The system memory may also be referred to as simply the memory, and includes read only memory (ROM) 1624 and random access memory (RAM) 1625. A basic input/output system (BIOS) 1626, containing the basic routines that help to transfer information between elements within the computer 1620, such as during start-up, is stored in ROM 1624. The computer 1620 may further includes a hard disk drive interface 1627 for reading from and writing to a hard disk, not shown, a magnetic disk drive 1628 for reading from or writing to a removable magnetic disk 1629, and an optical disk drive 1630 for reading from or writing to a removable optical disk 1631 such as a CD ROM or other optical media.

The hard disk drive 1627, magnetic disk drive 1628, and optical disk drive 1630 are connected to the system bus 1623 by a hard disk drive interface 1632, a magnetic disk drive interface 1633, and an optical disk drive interface 1634, respectively. The drives and their associated computer-readable media provide nonvolatile storage of computer-readable instructions, data structures, program modules and other data for the computer 1620. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 1629, optical disk 1631, ROM 1624, or RAM 1625, including an operating system 1635, one or more application programs 1636, the event data processing module 250, and program data 1638. As will be appreciated, any or all of the operating system 1635, the one or more application programs 1636, the event data processing module 250, and/or the data program data 1638 may at one time or another be copied to the system memory, as shown in FIG. 16.

A user may enter commands and information into the personal computer 1620 through input devices such as a keyboard 40 and pointing device 1642. Other input devices (not shown) may include a microphone, joystick, game pad, satellite dish, scanner, or the like. These and other input devices are often connected to the processing unit 1621 through a serial port interface 1646 that is coupled to the system bus, but may be connected by other interfaces, such as a parallel port, game port, or a universal serial bus (USB). A monitor 1647 or other type of display device is also connected to the system bus 1623 via an interface, such as a video adapter 1648. In addition to the monitor, computers typically include other peripheral output devices (not shown), such as speakers and printers.

The computer 1620 may operate in a networked environment using logical connections to one or more remote computers, such as remote computer 1649. These logical connections may be achieved by a communication device coupled to or a part of the computer 1620, or in other manners. The remote computer 1649 may be another computer, a server, a router, a network PC, a client, a peer device or other common network node, and typically includes many or all of the elements described above relative to the computer 1620, although only a memory storage device 1650 has been illustrated in FIG. 16. The logical connections depicted in FIG. 16 include a local-area network (LAN) 1651 and a wide-area network (WAN) 1652. Such networking environments are commonplace in office networks, enterprise-wide computer networks, intranets and the Internet, which are all types of networks.

When used in a LAN-networking environment, the computer 1620 is connected to the local network 1651 through a network interface or adapter 1653, which is one type of communications device. When used in a WAN-networking environment, the computer 1620 typically includes a modem 1654, a type of communications device, or any other type of communications device for establishing communications over the wide area network 1652. The modem 1654, which may be internal or external, is connected to the system bus 1623 via the serial port interface 1646. In a networked environment, program modules depicted relative to the personal computer 1620, or portions thereof, may be stored in the remote memory storage device. It is appreciated that the network connections shown are exemplary and other means of and communications devices for establishing a communications link between the computers may be used.

Although some exemplary methods, systems, and data structures have been illustrated in the accompanying drawings and described in the foregoing Detailed Description, it will be understood that the methods, systems, and data structures shown and described are not limited to the exemplary embodiments and implementations described, but are capable of numerous rearrangements, modifications and substitutions without departing from the spirit set forth and defined by the following claims.

The invention claimed is:

1. A method comprising:
   obtaining event data from each node in a group of associated nodes;
   identifying at least one single-node event burst occurring on each of a plurality of the nodes in the group of nodes based on the obtained event data, including identifying at least one node event that does not have a corresponding opposite node event and creating an opposite node event associated with the at least one node event; and
   identifying a multi-node event burst occurring in the group of associated nodes based on the identified single-node event bursts.

2. A method as recited in claim 1, wherein identifying a single-node event burst on a node comprises identifying outage events on a node occurring within a specified time frame.

3. A method as recited in claim 1, wherein identifying a single-node event burst on a node comprises identifying at least two outage events on a node that occur within a predetermined time from one another.

4. A method as recited in claim 1, wherein identifying a single-node event burst on a node comprises identifying a plurality of outage events on a node, each of the plurality of outage events occurring within a predetermined time of at least one other of the plurality of outage events.

5. A method as recited in claim 1, wherein identifying the multi-node event burst comprises identifying single-node event bursts occurring on at least two different nodes according to a predetermined timing rule.

6. A method as recited in claim 1, wherein identifying the multi-node event burst comprises identifying single-node event bursts occurring on at least two different nodes within a predetermined time from one another.

7. A method as recited in claim 1, wherein identifying the multi-node event burst comprises identifying a plurality of single-node event bursts, each of the plurality of single-node event bursts occurring within a predetermined time relative to at least one other of the plurality of outage events, wherein at least two of the single-node event bursts occur on different nodes.

8. A method as recited in claim 1, wherein obtaining event data from a node comprises obtaining data from an event log associated with the node.

9. A method as recited in claim 1, wherein obtaining event data from a node comprises obtaining information identifying up events and down events that have occurred on the node.

10. A method as recited in claim 1, wherein obtaining event data from a node comprises obtaining from an event log at the node information identifying up events and down events that have occurred on the node.

11. A method as recited in claim 1, further comprising storing the identified single-node event bursts in a single-node event bursts data structure and wherein the multi-node event burst is identified based on the single-node bursts stored in the single-node event bursts data structure.

12. A method comprising:
   obtaining event data from each node in a group of associated nodes;
   storing the obtained event data in an event table;
   identifying at least one single-node event burst occurring on each of a plurality of the nodes in the group of nodes based on the obtained event data;
   identifying at least one up event that does not have a corresponding down event in the data structure;
   creating an associated down event for the up event; and
   identifying a multi-node event burst occurring in the group of associated nodes based on the identified single-node event bursts.

13. A method comprising:
   obtaining event data from each node in a group of associated nodes;
   storing the obtained event data in an event table;
   identifying at least one down event that does not have a corresponding up event in the data structure;
   creating an associated up event for the down event; and
   identifying a multi-node event burst occurring in the group of associated nodes based on the identified single-node event bursts.

14. A method comprising:
   obtaining event data from each node in a group of associated nodes;
   identifying at least one single-node event burst occurring on each of a plurality of the nodes in the group of nodes based on the obtained event data; and
   identifying a multi-node event burst occurring in the group of associated nodes based on the identified single-node event bursts; and
   determining a relationship strength value for two nodes having associated single-node event bursts occurring in the identified multi-node event burst.

15. A method comprising:
   obtaining event data from each node in a group of associated nodes;
   identifying at least one single-node event burst occurring on each of a plurality of the nodes in the group of nodes based on the obtained event data;
   identifying a multi-node event burst occurring in the group of associated nodes based on the identified single-node event bursts;
   determining relationship strength values for pairs of nodes based on the identified multi-node event burst; and
   determining at least one cluster of related nodes based on the determined relationship strength values.

16. A method comprising:
   obtaining event data from each node in a group of associated nodes;
   identifying at least one single-node event burst occurring on each of a plurality of the nodes in the group of nodes based on the obtained event data;
   identifying a multi-node event burst occurring in the group of associated nodes based on the identified single-node event bursts;
   determining relationship strength values for pairs of nodes based on the identified multi-node event burst;
   determining at least one cluster of related nodes based on the determined relationship strength values; and
   determining at least one metric for the at least one cluster.

17. A method comprising:
   obtaining event data from each node in a group of associated nodes;
   identifying at least one single-node event burst occurring on each of a plurality of the nodes in the group of nodes based on the obtained event data;
   identifying a multi-node event burst occurring in the group of associated nodes based on the identified single-node event bursts;
   determining relationship strength values for pairs of nodes based on the identified multi-node event burst;
   determining at least one cluster of related nodes based on the determined relationship strength values;

determining at least one metric for the at least one cluster; and presenting the determined metric to a user.

18. A method comprising:
obtaining event data from each node in a group of associated nodes;
identifying at least one single-node event burst occurring on each of a plurality of the nodes in the group of nodes based on the obtained event data;
identifying a multi-node event burst occurring in the group of associated nodes based on the identified single-node event bursts;
determining relationship strength values for pairs of nodes based on the identified multi-node event burst;
determining at least one cluster of related nodes based on the determined relationship strength values;
determining a plurality of metrics for the at least one cluster; and
presenting the determined plurality of metrics to a user.

19. One or more processor-readable storage media having stored thereon processor executable instructions for performing acts comprising:
obtaining event data from each of a plurality of nodes in a node group;
identifying a multi-node event burst occurring in the node group based on the event data;
determining relationship strength values for pairs of nodes based on the identified multi-node event burst; and
determining at least one cluster of related nodes based on the determined relationship strength values.

20. One or more processor-readable storage media as recited in claim 19, further having stored thereon processor executable instructions for performing acts comprising:
determining at least one metric for the at least one cluster; and
presenting the determined metric to a user.

21. One or more processor-readable storage media as recited in claim 19, further having stored thereon processor executable instructions for performing acts comprising:
determining a plurality of metrics for the at least one cluster; and
presenting the determined plurality of metrics to a user.

22. One or more processor-readable storage media as recited in claim 19, wherein identifying a multi-node event burst comprises:
identifying a single-node event bursts on each of a plurality of nodes based on the obtained event data; and
identifying the multi-node event burst based on the identified single-node event bursts.

23. One or more processor-readable storage media as recited in claim 21, wherein identifying a single-node event burst on a node comprises identifying at least two outage events on a node that occur within a predetermined time from one another.

24. One or more processor-readable storage media as recited in claim 21, wherein identifying a single-node event burst comprises identifying a plurality of outage events on a node, each of the plurality of outage events occurring within a predetermined time of at least one other of the plurality of outage events.

25. One or more processor-readable storage media as recited in claim 19, wherein identifying the multi-node event bursts comprises identifying single-node event bursts occurring on at least two different nodes according to a predetermined timing rule.

26. One or more processor-readable storage media as recited in claim 19, wherein identifying the multi-node event burst comprises identifying single-node event bursts occurring on at least two different nodes within a predetermined time relative to one another.

27. One or more processor-readable storage media as recited in claim 19, wherein identifying the multi-node event bursts comprises identifying a plurality of single-node event bursts, each of the plurality of single-node event bursts occurring within a predetermined time relative to at least one other of the plurality of outage events, wherein at least two of the single-node event burst occur on different nodes.

28. One or more processor-readable storage media as recited in claim 19, wherein relationship strength values are determined using a relationship strength rule.

29. One or more processor-readable storage media as recited in claim 19, wherein relationship strength values are determined using a plurality of relationship strength rules.

30. One or more processor-readable storage media as recited in claim 19, wherein relationship strength values are determined using a plurality of relationship strength rules and the similarity of node names.

31. One or more processor-readable storage media as recited in claim 19, wherein relationship strength values are determined using a plurality of relationship strength rules and node name similarity values.

32. One or more processor-readable storage media as recited in claim 19, wherein each node has a name associated therewith and wherein a relationship strength value for a pair of nodes is determined using at least one relationship strength rule and value indicating a relative similarity between the names of the pair of nodes.

33. One or more processor-readable storage media having stored thereon processor executable instructions for performing operations comprising:
identifying a multi-node event burst occurring in a node group based on the event data collected from each of a plurality of nodes in a node group;
determining a cluster of related nodes based on the identified multi-node event burst; and
determining at least one metric for cluster.

34. One or more processor-readable storage media as recited in claim 33, wherein the at least one metric is a monitoring time period for the cluster.

35. One or more processor-readable storage media as recited in claim 33, wherein the at least one metric is a time period over which all nodes in the cluster are simultaneously down.

36. One or more processor-readable storage media as recited in claim 33, wherein the at least one metric is a time period over which at least one of the nodes in the cluster down and not all of the nodes in the cluster are down.

37. One or more processor-readable storage media as recited in claim 33, wherein the at least one metric comprises a plurality of metrics.

38. One or more processor-readable storage media as recited in claim 33, further having stored thereon processor executable instructions for performing an operation comprising:
presenting the determined metric to a user.

39. A computer system comprising:
means for obtaining event data from each of a plurality of nodes of a group of associated nodes;
means for identifying single-node event bursts occurring on the nodes based on the obtained event data, including means for identifying at least one node event that does not have a corresponding opposite node event and means for creating an opposite node event associated with the at least one node event; and means for identifying a multi-node event burst occurring in the group of associated nodes based on the identified single-node bursts.

40. A computer system as recited in claim 39, wherein identifying a single-nod event burst on a node comprises identifying outage events on a node occurring within a specified time frame.

41. A computer system as recited in claim 39, wherein identifying a single-nod event burst on a node comprises identifying at least two outage events on a node that occur within a predetermined time from one another.

42. A computer system as recited in claim 39, wherein identifying a single-nod event burst on a node comprises identifying a plurality of outage events on a node, each of the plurality of outage events occurring within a predetermined time of at least one other of the plurality of outage events.

43. A computer system as recited in claim 39, wherein identifying the multi-nod event bursts comprises identifying single-node event bursts occurring on at least two different nodes within a predetermined time.

44. A computer system as recited in claim 39, wherein identifying the multi-node event burst comprises identifying single-node event bursts occurring on at least two different nodes within a predetermined time from one another.

45. A computer system as recited in claim 39, wherein identifying the multi-node event burst comprises identifying a plurality of single-node event bursts, each of the plurality of single-node event bursts occurring within a predetermined time of at least one other of the plurality of the plurality of single node event bursts, wherein at least two of the single-node event burst occur on different nodes.

46. A computer system as recited in claim 39, wherein obtaining event data from a node comprises obtaining data from an event log associated with the node.

47. A computer system as recited in claim 39, wherein obtaining event data from a node comprises obtaining information identifying up events and down events that have occurred on the node.

48. A computer system as recited in claim 39, wherein obtaining event data from a node comprises obtaining from an event log at the node information identifying up events and down events that have occurred on the node.

49. A computer system as recited in claim 39, further comprising means for storing the identified single-node event bursts in a single-node event bursts data structure and wherein the multi-node event burst is identified based on the single-node bursts stored in the single-node event bursts data structure.

50. A computer system comprising:
means for obtaining event data from each of a plurality of nodes of a group of associated nodes;
means for identifying single-node event bursts occurring on the nodes based on the obtained event data;
means for identifying a multi-node event burst occurring in the group of associated nodes based on the identified single-node bursts; and
means for storing the obtained event data in an event table and wherein identifying single-node event bursts includes identifying at least one up event that does not have a corresponding down event in the data structure and creating an associated down event for the up event.

51. A computer system comprising:
means for obtaining event data from each of a plurality of nodes of a group of associated nodes;
means for identifying single-node event bursts occurring on the nodes based on the obtained event data;
means for identifying a multi-node event burst occurring in the group of associated nodes based on the identified single-node bursts; and
means for storing the obtained event data in an event table and wherein identifying single-node event bursts includes identifying at least one down event that does not have a corresponding up event in the data structure and creating an associated up event for the down event.

52. A computer system comprising:
means for obtaining event data from each of a plurality of nodes of a group of associated nodes;
means for identifying single-node event bursts occurring on the nodes based on the obtained event data;
means for identifying a multi-node event burst occurring in the group of associated nodes based on the identified single-node bursts; and
means for determining a relationship strength value for two nodes having associated single-node event bursts occurring in an identified multi-node event burst.

53. One or more processor-readable storage media as recited in claim 21, wherein identifying a single-node event burst on a node comprises identifying outage events on a node occurring within a specified time frame of one another.

* * * * *